INVENTOR.
GERALD P. RICHARDS
BY
W. A. Sprouagle
Attorney

March 25, 1969 G. P. RICHARDS 3,435,134

DIGITAL TELEVISION DATA COMPRESSION SYSTEM

Filed March 21, 1966 Sheet 2 of 16

INVENTOR.
GERALD P. RICHARDS
BY
W. H. Spouagle
Attorney

INVENTOR.
GERALD P. RICHARDS
BY
W. H. Sponagle
Attorney

INVENTOR.
GERALD P. RICHARDS
BY
W. H. Sprague
Attorney

March 25, 1969 G. P. RICHARDS 3,435,134

DIGITAL TELEVISION DATA COMPRESSION SYSTEM

Filed March 21, 1966 Sheet 5 of 16

INVENTOR.
GERALD P. RICHARDS
BY
W. H. Sponagle
Attorney

INVENTOR.
GERALD P. RICHARDS
BY
W. H. Sprangle
Attorney

INVENTOR.
GERALD P. RICHARDS
BY
W. H. Sprague
Attorney

INVENTOR.
GERALD P. RICHARDS
BY
W. H. Sprague
Attorney

March 25, 1969 G. P. RICHARDS 3,435,134

DIGITAL TELEVISION DATA COMPRESSION SYSTEM

Filed March 21, 1966 Sheet 9 of 16

INVENTOR.
GERALD P. RICHARDS
BY
W. H. Sprague
Attorney

INVENTOR.
GERALD P. RICHARDS
BY
Attorney

March 25, 1969 G. P. RICHARDS 3,435,134

DIGITAL TELEVISION DATA COMPRESSION SYSTEM

Filed March 21, 1966 Sheet 11 of 16

INVENTOR.
GERALD P. RICHARDS
BY
W. H. Sprague
Attorney

INVENTOR
GERALD P. RICHARDS
BY W. H. Sprague
Attorney

INVENTOR.
GERALD P. RICHARDS
BY [signature]
Attorney

INVENTOR.
GERALD P. RICHARDS
BY
W. H. Sponagle
Attorney

INVENTOR.
GERALD P. RICHARDS
BY
W. H. Sponagle
Attorney

Fig. 19.

| TIME INTERVAL | EXAM. REG. 37 | ACCORDION REG. 38 | 1ST DELAY REG. 39 | 2ND DELAY REG. 41 | COARSE OUT. 42 | FINE OUT. 43 |
|---|---|---|---|---|---|---|
| 1 | Ca(1) | Ca(1) | | | | |
| 2 | Ca(2) | Ca(2) | Ca(1) | | | |
| 3 | Fn(3) | Fn(3) | Ca(2) | Ca(1) | | |
| 4 | F(5) | Fn(3) | Fn(3) | Ca(2) | Ca(1) | Fn(3) |
| 5 | F(6) | F(5) | Fn(3) | Fn(3) | Ca(2) | Fn(3) |
| 6 | F(7) | F(6) | F(5) | Fn(3) | Ca(2) | Fn(3) |
| 7 | F(8) | F(7) | F(6) | F(5) | Ca(2) | Fn(3) |
| 8 | $F(8)^{\overline{MS}}$ | F(8) | F(7) | F(6) | Ca(2) | F(5) |
| 9 | Cb(1) | Cb(1) | F(8) | F(7) | Ca(2) | F(6) |
| 10 | $Cb(2)^{\overline{MS}}$ | $Cb(2)^{\overline{MS}}$ | Cb(1) | F(8) | Ca(2) | F(7) |
| 11 | Cc(1) | Cc(1) | Cb(1) | Cb(1) | Ca(2) | F(8) |
| 12 | Cc(2) | Cc(2) | Cc(1) | Cb(1) | Cb(1) | F(100) |
| 13 | $Cc(3)^{\overline{MS}}$ | $Cc(3)^{\overline{MS}}$ | Cc(2) | Cc(1) | Cb(1) | F(100) |
| 14 | Cd | Cd | Cc(2) | Cc(2) | Cc(1) | F(100) |
| 15 | Ce | Ce | Cd | Cc(2) | Cc(2) | F(100) |
| 16 | | | Ce | Cd | Cc(2) | F(100) |
| 17 | | | | Ce | Cd | F(100) |
| 18 | | | | | Ce | F(100) |

INVENTOR.
GERALD P. RICHARDS
BY
W. H. Sprague
Attorney

United States Patent Office 3,435,134

Patented Mar. 25, 1969

3,435,134

DIGITAL TELEVISION DATA COMPRESSION SYSTEM

Gerald P. Richards, Trenton, N.J., assignor to Radio Corporation of America, a corporation of Delaware Filed Mar. 21, 1966, Ser. No. 535,770
Int. Cl. H04n 7/04
U.S. Cl. 178—6 17 Claims This invention relates to signalling systems for the transmission and reception of signals representing pictorial and like subject matter and particularly to the system utilizing digital signals for conveying subject information with a high degree of accuracy.

As an alternative to the transmission and reception of subject representative analog signals, as in U.S. standard broadcast television for example, there is a growing need for the use of digital signals, as in transmission from satellites for example. It has been determined that a good reproduction of a subject can be made from signals representing sixty-four (64) different brightness values of a subject. In order to present such signals in digital form, a six-bit (or digit) code is required. The transmission of six-bit digital signals at a practical rate necessitates the use of a channel having an impractically great bandwidth.

It, therefore, is an object of the present invention to provide a signalling system for the transmission and reception of digital signals in a channel having considerably less bandwidth than one which would be required for the transmission and reception of six-bit digital signals.

In accordance with the invention, a smaller number than six- (e.g. three) bit digital signals are used to convey brightness information regarding each elemental picture area. Like other prior art systems for compressing transmission channel bandwith, the present system takes advantage of the redundancies in the picture. Unlike other prior art systems, however, the present one replaces some of the picture redundancy with more accurate useful information.

According to the particular illustrative embodiment of the invention disclosed herein, an analog video signal representing a subject which has been quantitized into sixty-four (64) brightness values is converted to six-bit digital signals. The first three digits of each signal constitute a coarse word signifying one of eight (8) course brightness values of the subject and the last three digits of each signal constitute a fine word signifying one of eight (8) fine brightness values of the subject within any one of the coarse brightness values. Only coarse or fine (never both) information regarding each elemental subject area is transmitted to the receiver. The receiver must, therefore, be able to determine the coarse or fine word identity in order to properly reproduce a picture of the subject. One of the features of the present invention is to enable such identification by means of the picture information-bearing three-bit digital signals themselves, thereby obviating the need for the additional transmission of special status-indicating signals which would necessitate either additional channel bandwidth or the omission of some picture information-bearing signals.

When it is determined that there are at least four (4) consecutive coarse digital words which are identical, only the first two of such words are transmitted. The next (i.e. third) signal transmitted is a fine digital word and such fine word transmission continues as long as additional coarse words identical to the first four (4) continue to occur. When the receiver is operating in the coarse word mode, the reception of two identical digital words generally is a status-indicating signal which functions to switch the receiver to a fine word operating mode. There are exceptions to this general rule which will be discussed subsequently.

The fine word transmission and reception continue until it is determined that a different coarse word occurs at the transmitter indicating a shift to a different coarse brightness value. The fine word digital signal representing the elemental picture area immediately preceding the shift to the new coarse brightness value is transmitted a second time but with a change in its most significant bit position. Thus, when the receiver is operating in the fine word mode, the reception of two digital words which differ only in their most significant bit position is a status-indicating signal which functions to switch the receiver to a coarse word operating mode.

In the event that only two (2) adjacent picture elements have the same coarse brightness values, the second coarse word is transmitted with its most significant bit inverted. While the receiver is operating in the coarse word mode, the reception of two digital words which differ only in their most significant bit position is a status-indicating signal which functions to maintain the receiver in its course word mode and causes the receiver to replace the second (altered) word with a repetition of the second word.

When only three (3) adjacent picture elements have the same coarse brightness values, the first two coarse digital words are transmitted normally but the third coarse digital word is transmitted with its most significant bit inverted. At the receiver, which is operating in the coarse word mode, the reception of the first two identical coarse digital words normally would cause the receiver to shift to the fine word operating mode; but, the immediately succeeding reception of the third coarse digital word with its most significant bit inverted causes the receiver to stay in its coarse word operating mode and causes the replacement of the third (altered) word by the second word.

When the receiver is operating in either the coarse or fine word mode and two adjacent picture elements have respective brightness values which differ such that their respective three-bit digital words differ from one another only in the most significant bit, in order to avoid receiver confusion, the second of such digital words is transmitted with an inversion of its least significant bit. This is the only case in which exact data is not transmitted in the system according to this invention. If the system is operating in the fine word mode, the resulting error will be one of only one fine brightness value which will be virtually unnoticeable. If the system is operating in the coarse word mode, such a signal relatively can occur only in the extremely unlikely event that two adjacent picture elements differ in brightness values by approximately thirty-nine (30) percent of full scale. If it should occur, however, the reproduced picture element will still have two-bit accuracy.

For a better understanding of the invention, reference should be had to the following description which is taken in conjunction with the accompanying drawings, of which:

FIGURE 19 is a time table showing the step-by-step processing of the three-bit digital signals through the decoder apparatus of FIGURE 2.

Figure 1:
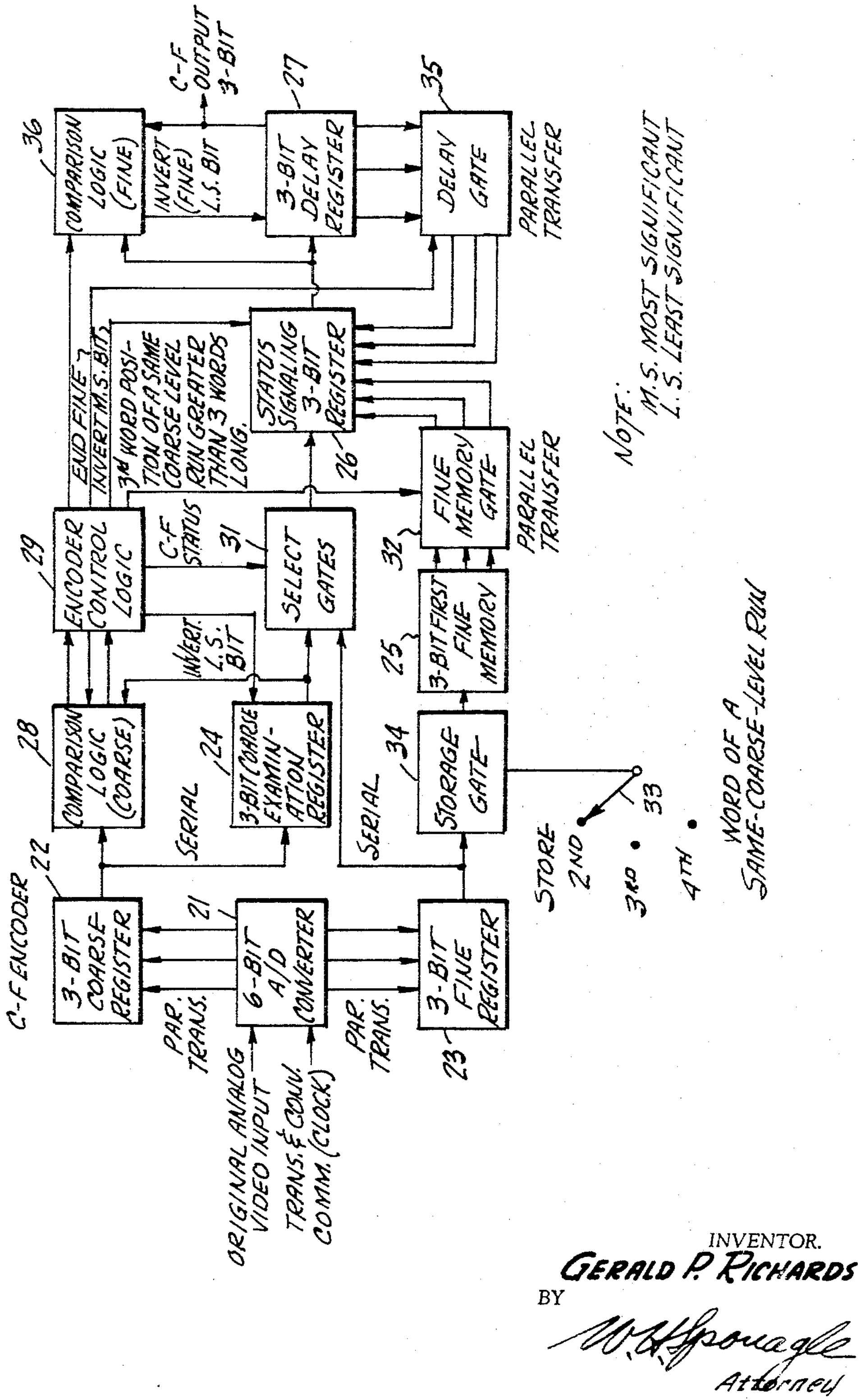
FIGURE 1 is a block diagram of the basic elements and their functional interconnections of the signal encoder at a transmitting point.

In FIGURE 1, the analog video signals representing a subject are impressed upon an analog-to-digital signal converter 21 which may be of conventional form and by which the signals representing the brightness values of successive elemental areas of the subject are converted into six-bit digial words. The first three digits of each signal represent one of the eight coarse brightness values of the subject, and are referred to in the following description and in the claims as a coarse digital word. The last three digits of the signal represent a fine brightness value of the subject within any one of the coarse brightness values and will be referred to hereinafter as a fine digital word.

The output of the analog-to-digital signal converter 21 separates the coarse and fine words. The three-bit coarse words are transferred simultaneously by parallel circuits to a three-bit coarse register 22. Similarly, the three-bit fine words are transferred simultaneously by parallel circuits to a three-bit fine register 23.

In the following description, reference will be made frequently to time intervals. It is to be understood that these time intervals all are of equal duration, and for the purposes of this disclosure, may be considered as the time required to transfer a six-bit word in a serial manner from one piece of apparatus to another. Having separated the six-bit words into three-bit coarse and fine words as described, these coarse and fine words are separately processed, both in the encoder apparatus of FIGURE 1 and the later-to-be-described decoder apparatus of FIGURE 2. Manifestly, it requires only half as much time to serially transmit a three-bit word from one place to another as required for the serial or time sequential transmission of a six-bit word. Herein lies the reason that the system embodying this invention requires a transmission channel having substantially only half of the frequency bandwidth as one which would normally be required for the transmission of six-bit digital information. In a successfully operated embodiment of such a system, the time intervals employed were six-bit word intervals, the last three bits of which, were not used to convey information. It will be understood, however, that the realization of the benefits to be derived from such a system may readily be achieved by known techniques for effecting the transfer of three-bit inforation within the encoding and decoding apparatus and the transmission of such signals from an encoding device to a decoding device by effectively extending the transmission time of the three-bit information throughout the same interval utilized for transferring six-bit information serially over a channel having twice the bandwidth.

In the following detailed description of the operation of the encoder apparatus of FIGURE 1, it may be helpful to refer additionally to the table of FIGURE 18. It will be assumed that the first eight (8) elemental picture areas have a first coarse brightness value, followed by two (2) areas having a second coarse brightness value, followed by three (3) areas having a third coarse brightness value, followed by two (2) areas having respective fourth and fifth coarse brightness values. The description will discuss the events occurring during successive time intervals.

The encoder of FIGURE 1 comprises six (6) principal three-bit registers for processing one or both of the coarse and fine words. These registers are the coarse input register 22, the fine input register 23, a coarse examination register 24, a fine word memory register 25, a status signalling register 26 and a delay register 27.

The coarse and fine input registers 22 and 23 respectively receive the coarse and fine words from the analog-to-digital converter 21 as described. The coarse examination register 24 serves, in combination with a comparison logic circuit 28, to compare each coarse word therein with the immediately succeeding coarse word. The fine word memory register 25 stores a selected fine word for use as the first fine word transmitted during a sequence of four (4) or more coarse picture elemental brightness values. The status signalling register 26 stores either coarse or fine words while the status of subsequent coarse picture brightness values is being determined by an examination of the representative coarse words. The delay register 27 stores either coarse or fine words prior to transmission to the receiver.

ENCODER TIME INTERVAL 1

A first coarse word $Ca(1)$ and a first fine word $F(1)$ are transferred respectively to the coarse and fine registers 22 and 23.

ENCODER TIME INTERVAL 2

The first coarse word $Ca(1)$ is transferred in serial fashion to the three-bit coarse examination register 24 and the first fine word $F(1)$ is transferred in serial fashion to the three-bit fine memory register 25. Additionally, a second coarse word $Ca(2)$ and a second time word $F(2)$ are transferred respectively to the coarse and fine registers 22 and 23.

ENCODER TIME INTERVAL 3

Assuming that the system is operating in a coarse word mode, the first coarse word $Ca(1)$ in the examination register 24 is transferred in serial fashion to the three-bit status signalling register 26. During coarse word operation, the first fine word $F(1)$ in the memory 25 is replaced by the second fine word $F(2)$. The second coarse word $Ca(2)$ is transferred from the coarse register 22 to the examination register 24. Also, third coarse word $Ca(3)$ and a third fine word $F(3)$ are placed respectively in the coarse and fine registers 22 and 23.

ENCODER TIME INTERVAL 4

The first coarse word $Ca(1)$ is transferred from the signalling register 26 to the delay register 27, the second coarse word $Ca(2)$ is transferred from the examination register 24 to the signalling register 26, the third coarse word $Ca(3)$ is transferred from the coarse input register 22 to the examination register 24, and the fourth coarse word $Ca(4)$ is transferred from the analog-to-digital converter 21 to the coarse input register 22. Also, the second fine word $F(2)$ is replaced in the memory register 25 by the third fine word $F(3)$ and the fourth fine word $F(4)$ is placed in the fine input register 23 from the converter 21.

ENCODER TIME INTERVAL 5

The first coarse word $Ca(1)$ is transmitted to the receiver from the delay register 27 and is replaced by the second coarse word $Ca(2)$. The fourth coarse word $Ca(4)$ is transferred to the examination register 24 where it is compared with the immediately preceding third coarse word $Ca(3)$ by the comparison logic 28. In the assumed case, such comparison establishes that there are now four (4) successive identical coarse words. Accordingly, a signal from the comparison logic 28 is sent to an encoder control logic circuit 29 which causes two operations. One operation is to cause the select gates 31, by which the first and second coarse words $Ca(1)$ and $Ca(2)$ were transferred to the signalling register 26, to interrupt further coarse word transfers and, instead, to transfer subsequent fine words from the fine register 23 to the signalling register 26. The other operation is to actuate a fine memory gate 32 to immediately transfer, in parallel fashion, the selected fine word stored in the memory register 25 to the signalling register 26. The manner of such selection will be described in the next paragraph. The fifth coarse word $Ca(5)$ and the fifth fine word $F(5)$ are placed respectively in the coarse and fine input registers 22 and 23.

It will be recognized that, for the complete reconstitution of the subject brightness levels in the receiver, there will be required both coarse and fine information. Consequently, while coarse word information is being transmitted from the encoder apparatus in the manner described, facilities, later to be described, are provided at the decoder apparatus of the receiver to supply the needed fine information. Also, it will be recognized from the preceding description of the encoding apparatus that certain fine information from the subject is being discarded during the transmission of coarse information. Facilities are provided, however, for supplying some of this fine information as soon as the system is switched to operation in its fine word operating mode. A number of choices are available for the first fine digital word to be transmitted at the start of a fine data run. During a coarse word run, the first fine memory register 25 can be selectively switched to store the fine information accompanying either the second, third or fourth coarse word. This selection is effected by means of a switch 33, which controls the operation of a storage gate 34 through which the selected fine word information is stored in the memory 25. For the purpose of the present description, it is assumed that the fine $F(3)$ is selected for the first fine word $Fn$ and will be designated $Fn(3)$.

ENCODER TIME INTERVAL 6

The selected first fine word $Fn(3)$ is transferred from the signalling register 26 to the delay register 27 and the fifth fine word $F(5)$ is transferred from the fine input register 23 to the signalling register 26. Also, the sixth coarse and fine words $Ca(6)$ and $F(6)$ respectively are transferred to the coarse and fine input registers 22 and 23.

From the foregoing description, it may be seen that, during coarse data runs, the three-bit coarse words are passed in successive time intervals through the examination register 24, the status signalling register 26 and the delay register 27. Consequently, the coarse data output of the encoder is delayed from its input by three (3) word intervals. During fine data runs, the three-bit fine words are passed in successive time intervals through only the status signalling register 26 and the delay register 27. Hence, the encoder fine data output is delayed from its input by only two (2) word intervals.

ENCODER TIME INTERVALS 7, 8, 9 AND 10

Fine words $F(5)$, $F(6)$, $F(7)$ and $F(8)$ are placed at successive intervals in the delay register 27 after having been processed by the encoder in the manner described. In INTERVAL 9, a ninth coarse word $Cb(1)$ representing a new coarse picture brightness level is placed in the coarse input register 22. In INTERVAL 10, when the eighth fine word $F(8)$ is transferred to the delay register 27, and a tenth coarse word $Cb(2)$ is placed in the coarse input register 22, the coarse word $Cb(1)$ is transferred the examination register 24. This register, in conjunction with the coarse comparison logic 28, produces a signal which causes the encoder control logic 29 to effect three basic operations.

To effect a first one of these operations, a signal from the control logic 29 is applied to a delay gate 35 which functions to transfer the three-bit contents of the delay register simultaneously and in parallel back into the status signalling register 26. Just prior to such transfer, the fine data contents $F(8)$ of the delay register 27 represents the last fine elemental brightness value of the preceding coarse brightness value and the fine data contents $F(9)$ of the signalling register 26 represents the first fine elemental brightness value of the new coarse brightness value. Hence, as a result of the described transfer, the first fine data of the new coarse brightness value is discarded and the last fine data of the preceding coarse brightness value is recalled.

A second operation performed by the encoder control logic 29 as a result of the detection of the new coarse brightness value represented by the coarse word $Cb(1)$ is to invert the most significant bit of the recalled fine word $F(8)$ then resting in the status signalling register 26. Such a word is identified by the symbol $F(8)^{\overline{MS}}$.

The third operation performed by the encoder control logic 29 resulting from the detection of the new coarse brightness value represented by the coarse word $Cb(1)$ is to operate the select gates 31 so as to disconnect the status signalling register 26 from the fine register 23 and to reconnect it to the coarse examination register 24.

ENCODER TIME INTERVAL 11

A coarse word $Cc(1)$ and its associated fine word $F(11)$ representing a third coarse brightness value of the picture are placed respectively in the input registers 22 and 23. Also, the coarse words $Cb(1)$ and $Cb(2)$ are transferred respectively to the signalling register 26 and the coarse examination register 24. Additionally, the modified fine word $F(8)^{\overline{MS}}$ is moved into the delay register 27. When this fine word is received at the receiver immediately following the reception of the eighth fine word $F(8)$ (i.e. two fine words differing only in their most significant bit) the receiver recognizes this as the status-indicating signal signifying a shift from the fine word operating mode to the coarse word operating mode.

ENCODER TIME INTERVAL 12

Figure 18:
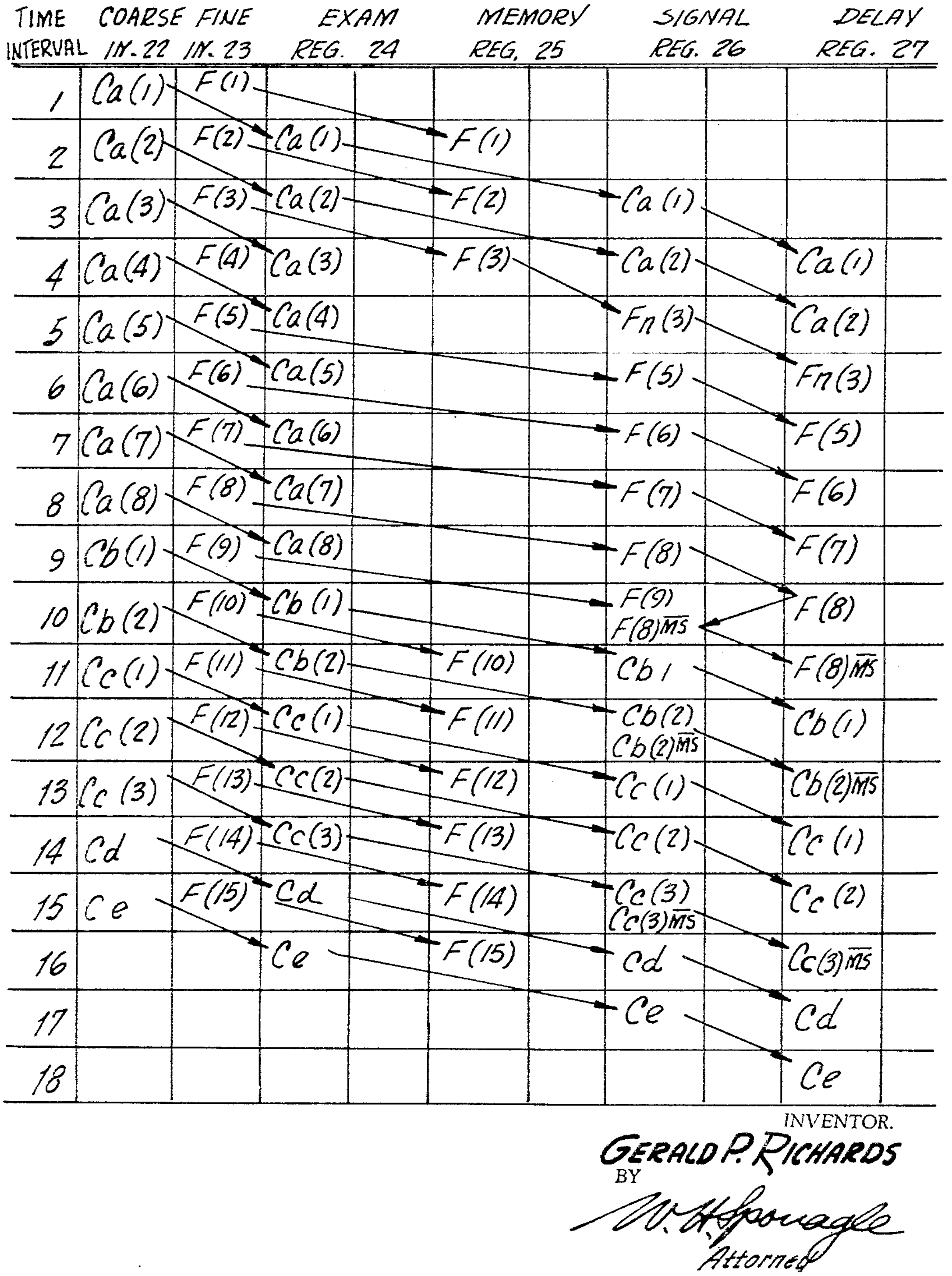
FIGURE 18 is a time table drawing the step-by-step processing of the three-bit digital signals through the encoder apparatus of FIGURE 1.

While a second coarse word $Cc(2)$ of the third coarse picture brightness value and its associated fine word $F(12)$ are placed respectively in the input registers 22 and 23, the other coarse words $Cb(1)$, $Cb(2)$ and $Cc(1)$ are advanced in the encoder as indicated in FIGURE 18. With the new coarse word $Cc(1)$ in the examination register 24, the encoder control logic 29, on signal from the coarse comparison logic 28, actuates the signalling register 26 so as to invert the most significant bit of the coarse word $Cb(2)$. The modified coarse word is designated herein as $Cb(2)^{\overline{MS}}$.

ENCODER TIME INTERVAL 13

The third coarse word $Cc(3)$ and its associated fine word $F(13)$ of the third coarse picture brightness value are placed respectively in the input registers 22 and 23 and the other coarse words $Cb(2)^{\overline{MS}}$, $Cc(1)$ and $Cc(2)$ are advanced as indicated in FIGURE 18. The reception at the receiver of the coarse word $Cb(2)^{\overline{MS}}$ immediately following the reception of the coarse word $Db(1)$ (i.e. two coarse words differing only in their most significant bit), is recognized as the status-indicating signal which continues the coarse word operating mode but causes the receiver to delete $Cb(2)^{\overline{MS}}$ and to replace it with a repetition of $Cb(1)$.

ENCODER TIME INTERVALS 14, 15, 16, 17 AND 18

During INTERVALS 14 and 15, coarse words C(*d*) and C(*e*), respectively representing the fourth and fifth coarse picture brightness values, are placed successively in the input register 22. They are processed through the encoder described and indicated in FIGURE 18, ending finally in the delay register 27 respectively in INTERVALS 17 and 18. Also, during INTERVALS 14, 15 and 16, the three coarse words C*c*(1), C*c*(2) and C*c*(3) are processed through the encoder as illustrated. The coarse word C*c*(3) is recognized by the examination register 24 and the coarse comparison logic 28 as representing the third and last picture element having that particular coarse brightness value. Accordingly, the encoder control logic 29 is effective to invert the most significant bit of this coarse word as it rests in the status signalling register 26 during INTERVAL 15 and it is represented herein by the symbol $Cc(3)^{\overline{MS}}$. With the successive transmission of the coarse words C*c*(1) and C*c*(2) the receiver normally would recognize the two identical coarse words as a status-indicating signal and shift to the fine word operating mode. The immediately succeeding transmission of the coarse word $Cc(3)^{\overline{MS}}$, however, causes the receiver to recognize the two successive words differing only in the most significant bit position as the status-indicating signal to shift to the coarse word operating mode. Hence, the receiver will continue in the coarse mode and will delete $Cc(3)^{\overline{MS}}$, replacing it with a repetition of C*c*(2).

It is, of course, recognized that the dual use of the digital signals as (1) representing subject brightness information and (2) status-indicating signals may occasionally be conflicting. For example, during a fine data run, two adjacent picture elements may differ from one another by exactly four fine brightness values. In such a case, the respective digital signals differ from one another only in the most significant bit position. As the second of these two fine words is entering the delay register 27, the conflict is detected by a fine comparison logic circuit 36. When that second fine word is completely transferred from the signalling register 26 to the delay register 27, the fine comparison logic 36 applies a signal to the delay register which is effective to invert the least significant bit of this conflicting fine word. In this way, a status-indicating signal signifying a shift to the coarse word operating mode is not transmitted to the receiver and this apparatus continues in the fine word operation mode.

In the event that two successive input coarse words differ from one another only in the most significant bit position, this fact is determined by the coarse comparison logic which applies an appropriate signal to the encoder control logic 29. The latter apparatus applies a signal to the examination register 24 which is effective to invert the least significant bit of the second one of the conflicting coarse words as it rests in the examination register.

Figure 2:
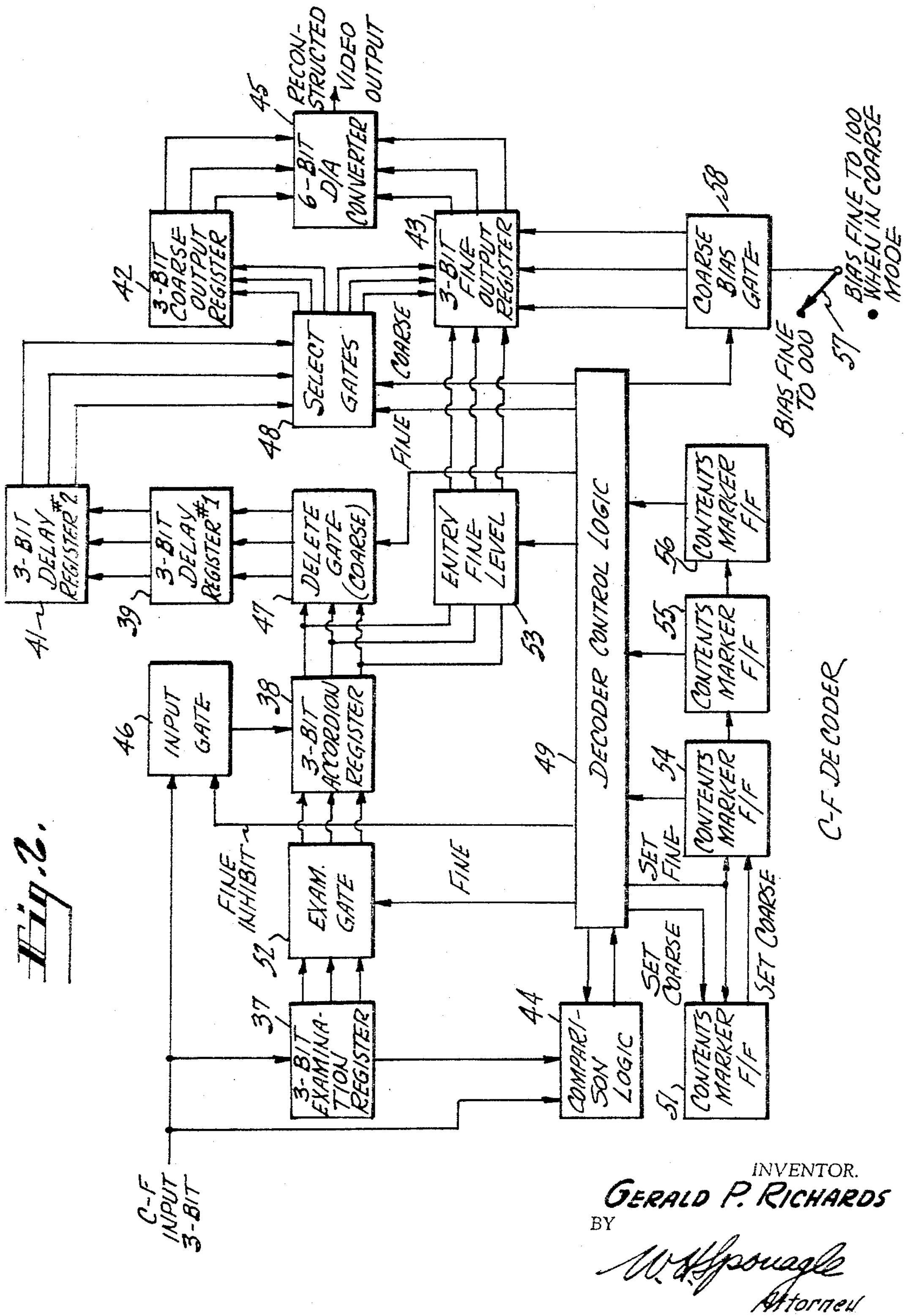
FIGURE 2 is a block diagram of the basic elements and their functional interconnections of the signal decoder at a receiving point.
Figure 3:
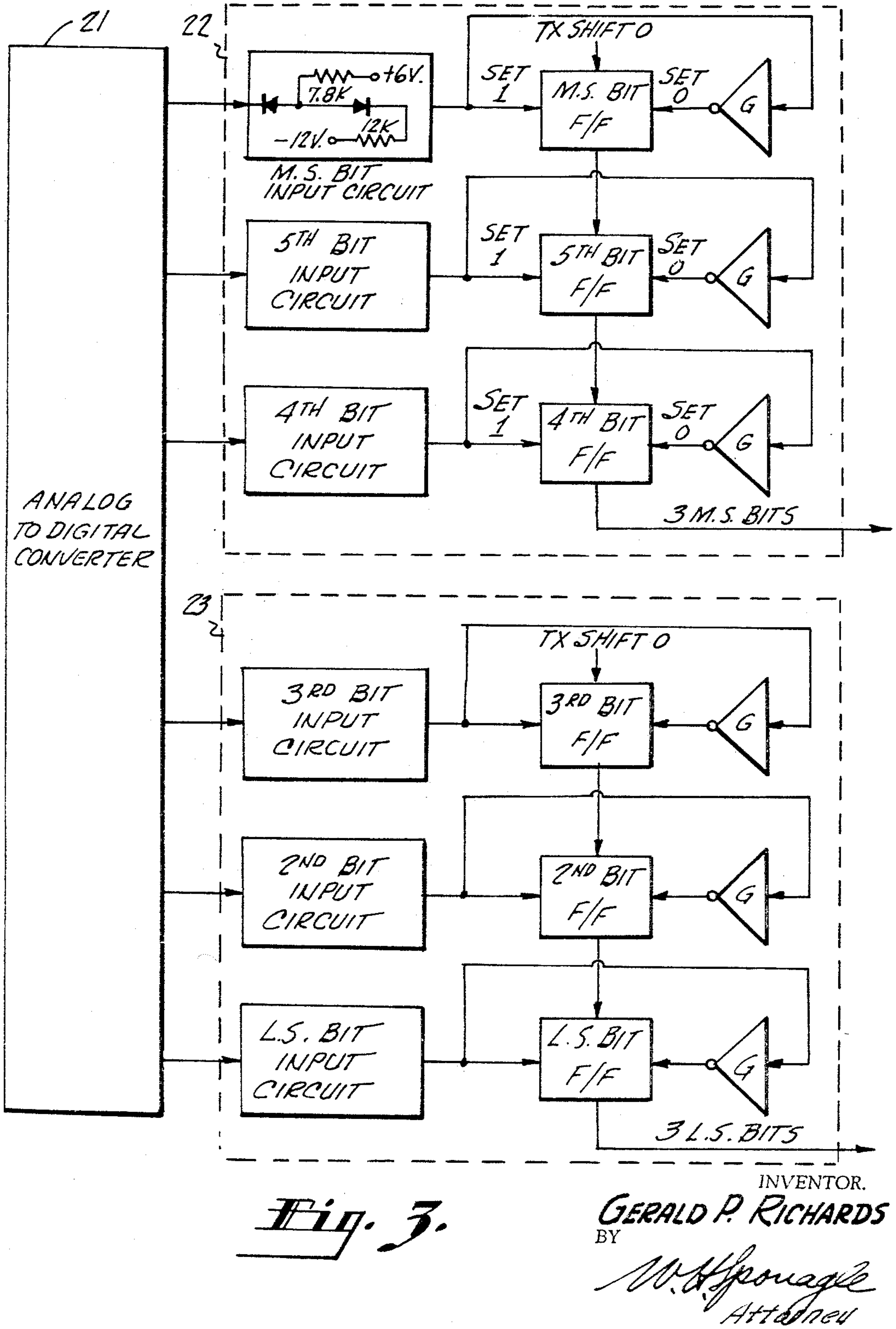
FIGURES 3, 4, 5, 6 and 7 are logic diagrams of the component parts and their operating interconnections of the basic encoder elements of FIGURE 1.
Figure 4:
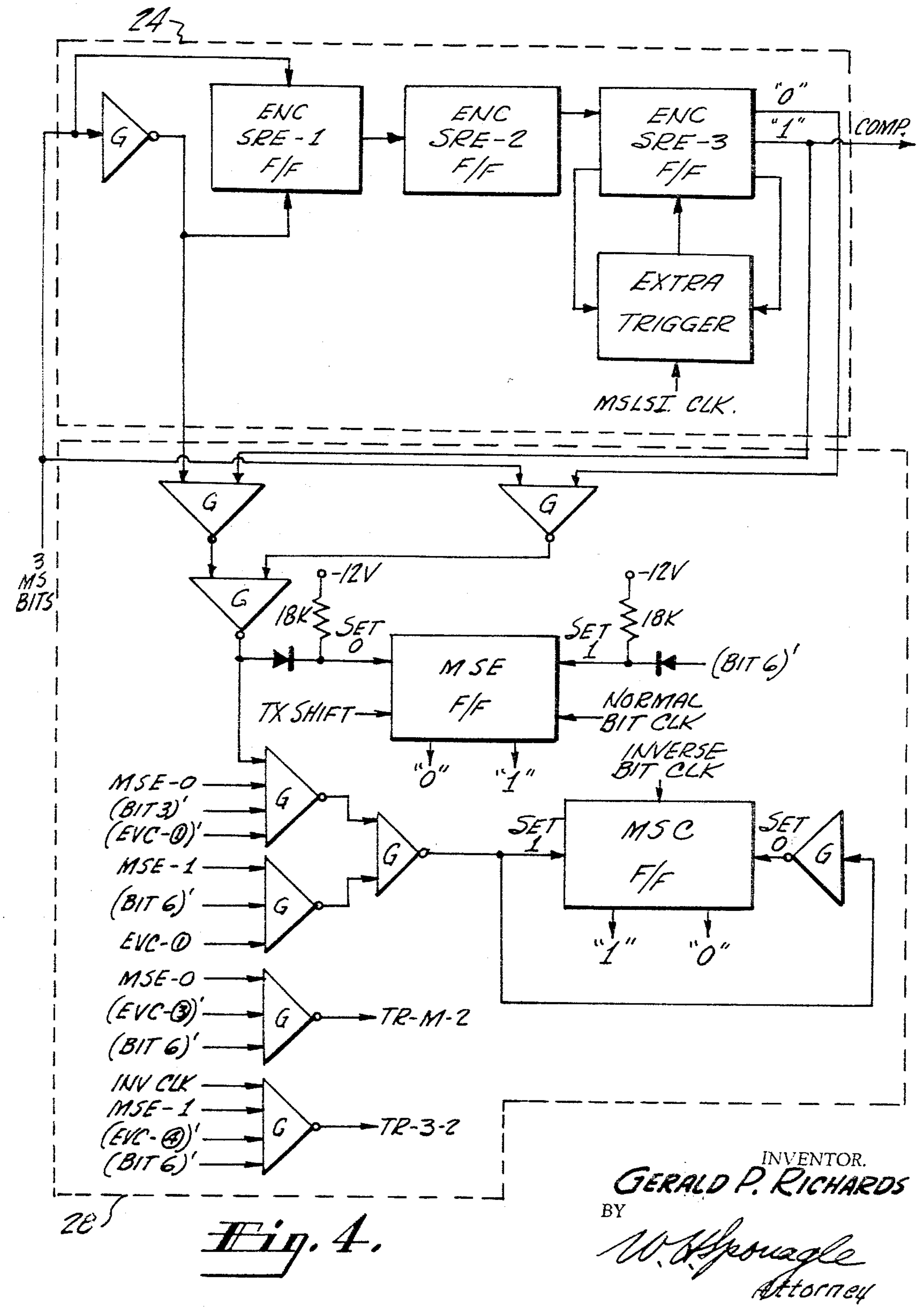
Figure 5:
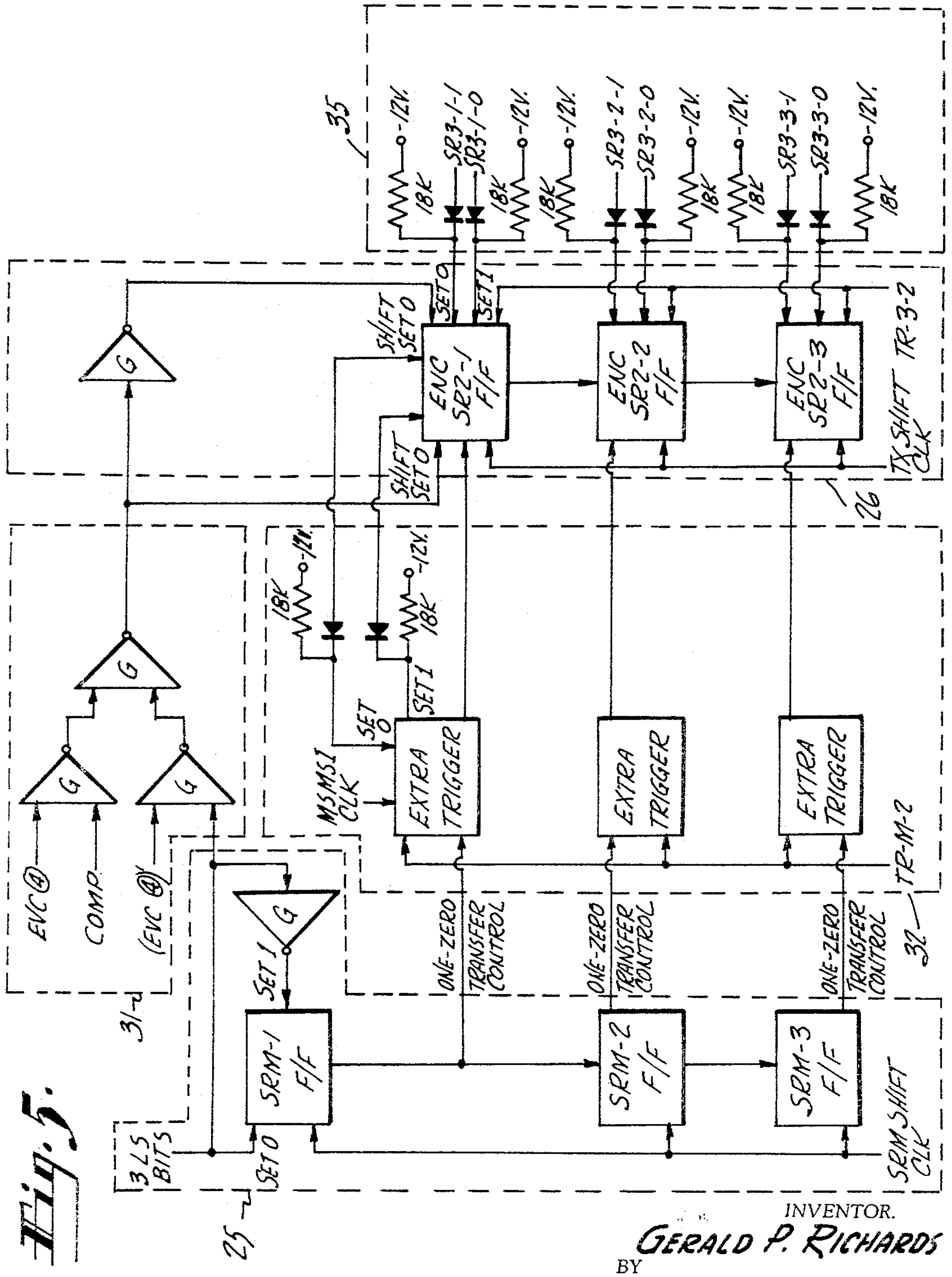
Figure 6:
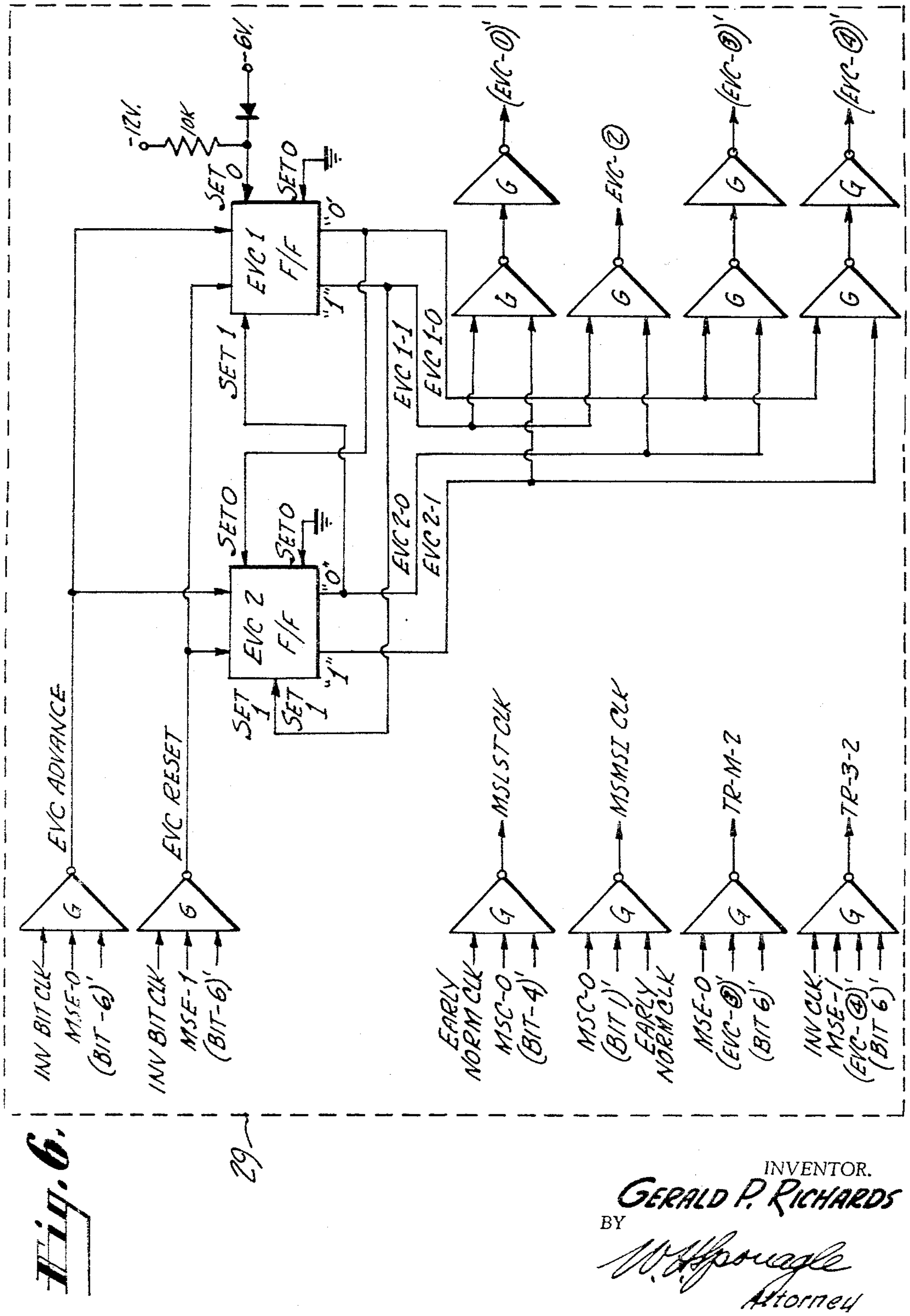
Figure 7:
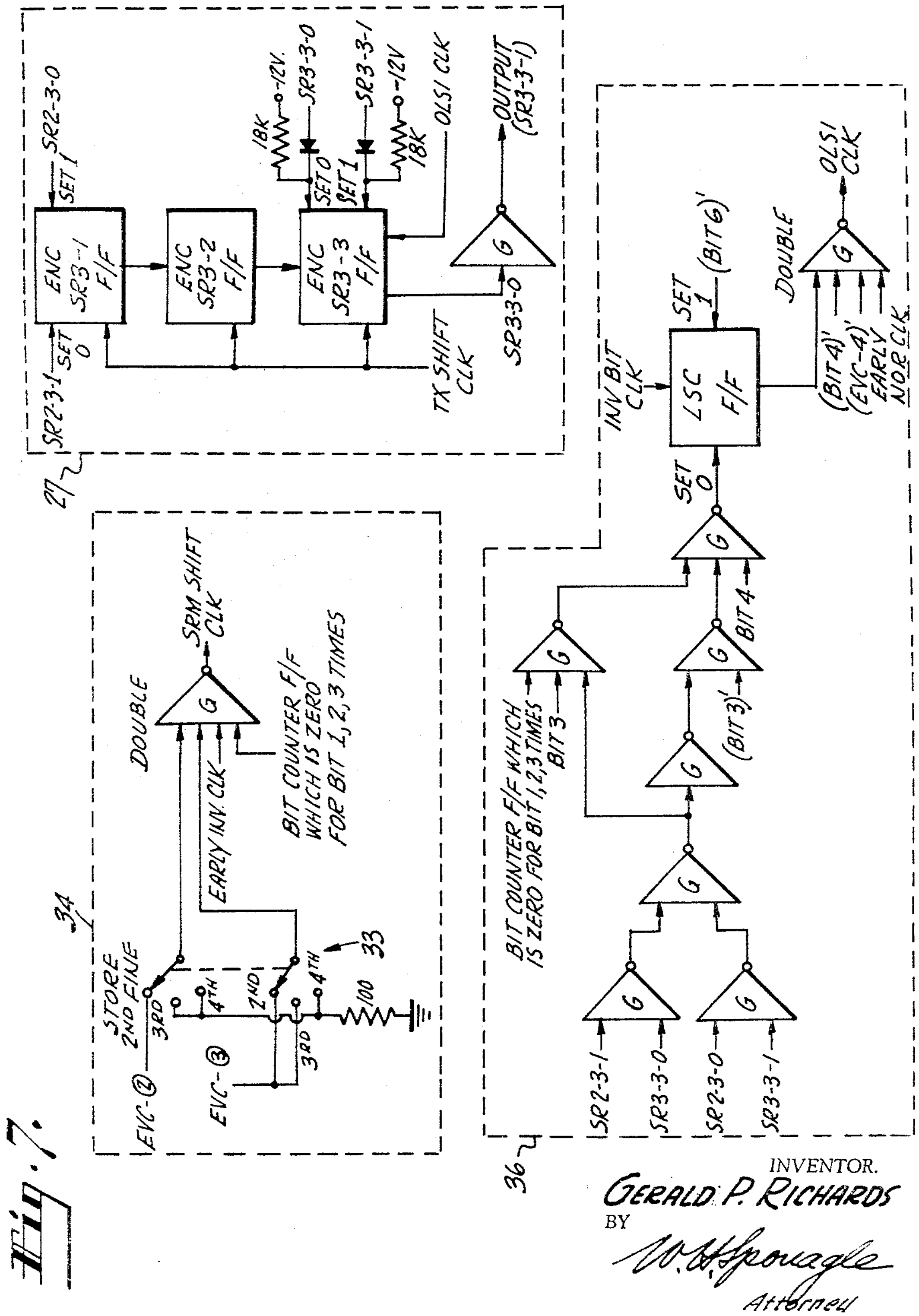
Figure 8:
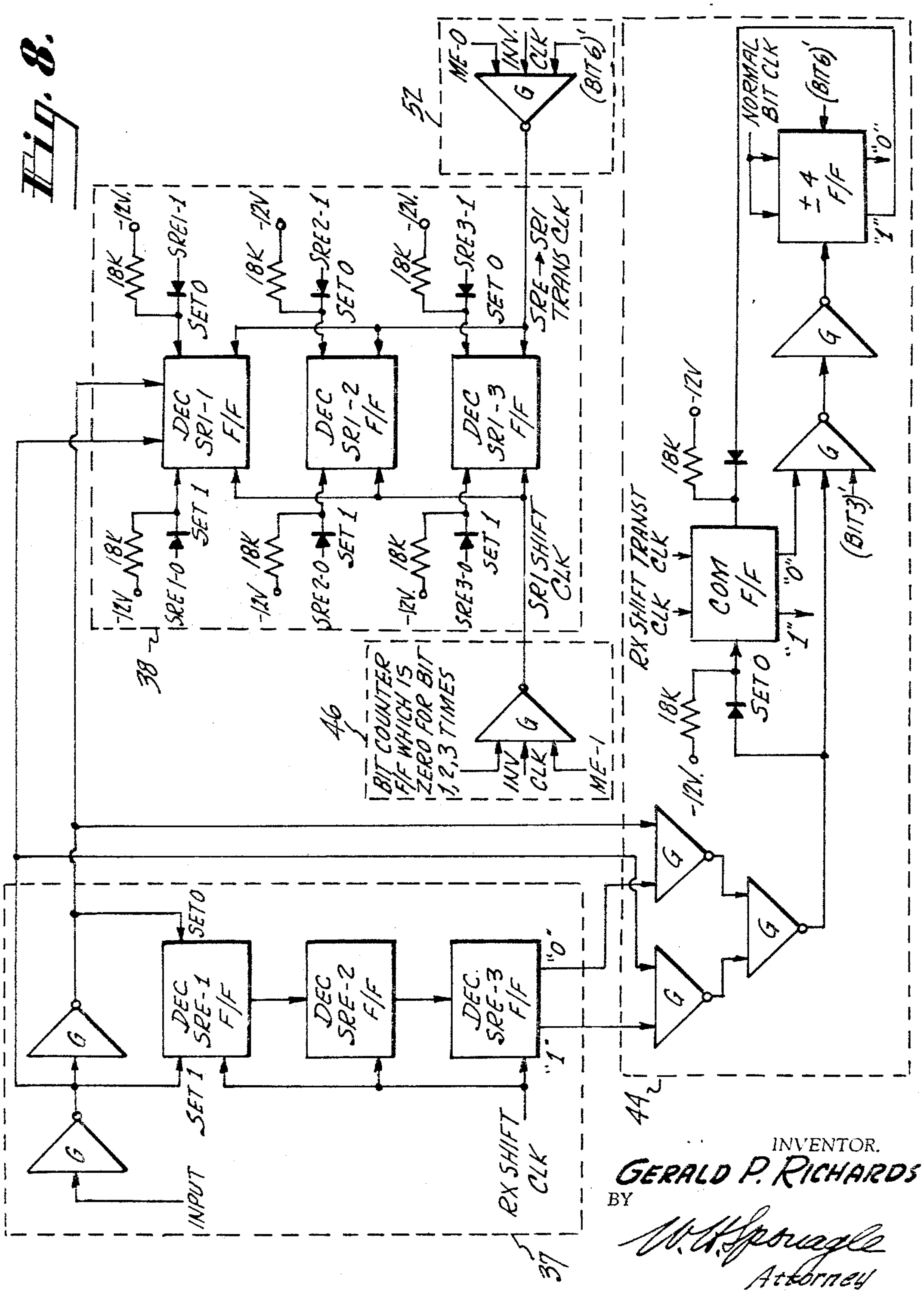
FIGURES 8, 9, 10 and 11 are logic diagrams of the component parts and their operating interconnections of the basic decoder elements of FIGURE 2.
Figure 9:
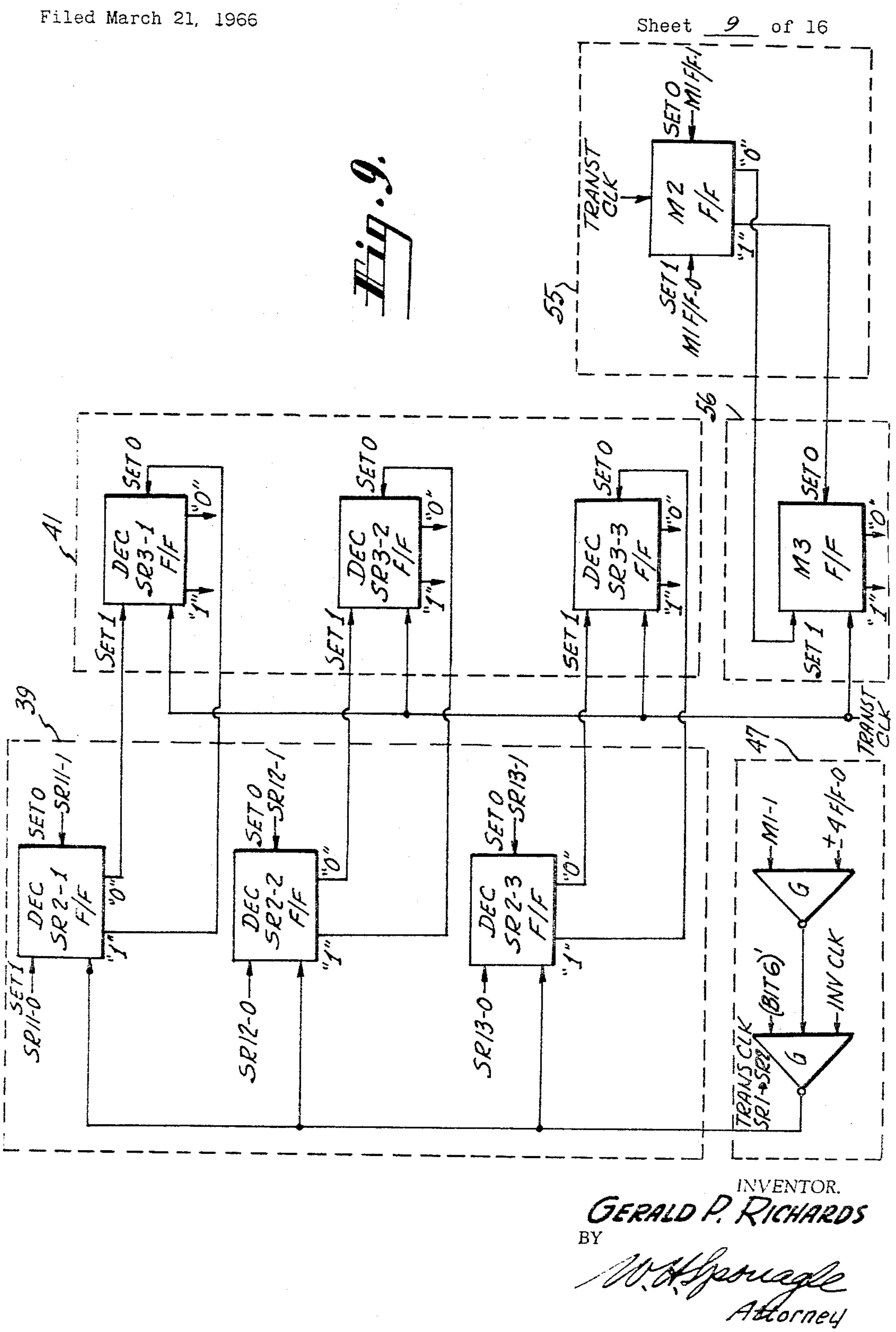
Figure 10:
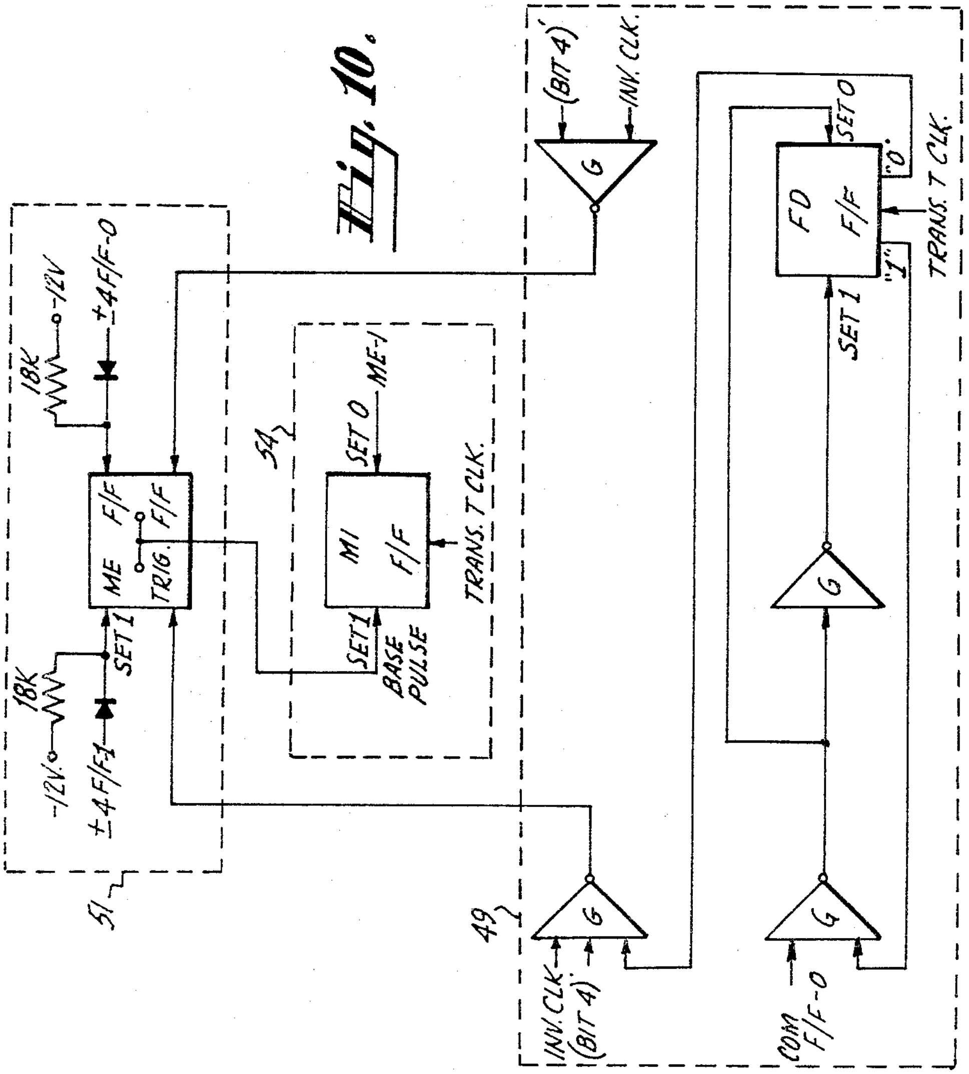

The decoder apparatus of the receiver of FIGURE 2 comprises six (6) principal three-bit registers for processing one or both of the coarse and fine words received from the encoder of FIGURE 1. These registers are an examination register 37, an accordion register 38, first and second delay registers 39 and 41, a coarse output register 42 and a fine output register 43.

The examination register 37, in conjunction with a comparison logic circuit 44, functions to compare each received word with the immediately succeeding word. The accordion register 38 receives coarse words directly from the decoder input and fine words from the examination register 37. The first and second delay registers 39 and 41 store either coarse or fine words for delivery to either the coarse or fine output registers 42 and 43, respectively. The contents of the output registers 42 and 43 are transferred to a digital-to-analog converter 45 by which the six-bit digital signals are converted to analog form for use in reproducing the picture on a cathode ray or similar device (not shown).

The following step-by-step description of the operation of the decoder of FIGURE 2 will be given for the reception and processing of the sequence of coarse and fine words transmitted from the encoder of FIGURE 1 as previously described.

DECODER TIME INTERVAL 1

The first coarse word C*a*(1) is impressed directly upon the examination register 37 and by means of an input gate 46, simultaneously upon the accordion register 38. At the end of this interval, the coarse word C*a*(1) is transferred from the accordion register 38 to the first delay register 39 through a coarse delete gate 47.

DECODER TIME INTERVAL 2

At the end of this interval, the first coarse word C*a*(1) is transferred into the second delay register 41. During this interval, the second coarse word C*a*(2) is impressed upon the examination and accordion registers 37 and 38 from the latter of which it is transferred to the first delay register 39 at the end of the interval.

DECODER TIME INTERVAL 3

At the end of this interval, the first coarse word C*a*(1) is transferred from the second delay register 41 to the coarse output register 42 through select gates 48 and, simultaneously, the second coarse word C*a*(2) is transferred from the first to the second delay registers 39 and 41 respectively. During this interval the first fine word F*n*(3) is impressed upon the examination and accordion registers 37 and 38 respectively and from the latter it is transferred to the first delay register 39 at the end of the interval. The detection by the comparison logic 44 of the two consecutive identical coarse words C*a*(1) and C*a*(2) which are followed by the first fine word F*n*(3) which does not differ from the second coarse word only in the most significant bit position causes three operations to take place.

A first operation is the impression upon a decoder control logic circuit 49 of an appropriate signal which, together with a signal from a first digital signal contents marker 51, functions to so control the input gate 46 as to inhibit the impression of additional received digital signals upon the accordion register 38.

A second operation is the impression of a signal from the decoder control logic 49 upon an examination gate 52, thereby activating the gate to effect the parallel transfer of the contents of the examination register 37 to the accordion register 38 at the end of this and subsequent time intervals. In the present interval, however, the first fine word F*n*(3) already rests in both the examination and accordion registers. Thus, this transfer is redundant for this particular interval.

The third operation occurs at the end of TIME INTERVAL 3 when, under the control of a signal from the decoder control logic 49, a gate 53 is actuated to transfer the first fine word F*n*(3) from the accordion register 38 simultaneously and in parallel to the fine output register 43. The gate 53 is operated only to transfer first fine words. No other subsequent fine words in a series of fine words are transferred by this gate.

The respective three-bit outputs of the coarse output register 42 and the fine output register 43 are applied to the digital-to-analog signal converter 45 which, it may be seen, receives six-bit digital information even though only three-bit digital signals are transmitted and received. In the case described, the first such six-bit digital signal comprises the first coarse word C*a*(1) and the first fine word F*n*(3). As previously indicated, this first fine word may represent the fine brightness value of a selected one of the second, third or fourth elemental picture areas (e.g. the third in the assumed case). It will appear from the following description that this same fine word F*n*(3)

is used as the fine portion of the reconstituted six-bit digital signal for the first four of such signals.

DECODER TIME INTERVAL 4

At the end of this interval the second coarse word *Ca*(2) is transferred from the second delay register 41 to the coarse output register 42. The first fine word F*n*(3) remains in the fine output register 43 so that the second six-bit digital signal comprises the second coarse word *Ca*(2) and the first fine word F*n*(3). The first fine word F*n*(3) which also is in both the accordion and first delay registers 38 and 39, respectively, is transferred to the first and second delay registers 39 and 41, respectively at the end of this interval. Also, the fifth fine word F(5) is placed in the examination register 37 from which it is transferred at the end of the interval by the now operated examination gate 52 to the accordion register 38.

DECODER TIME INTERVAL 5

The select gates 48 are operated under the control of a signal from the decoder control logic 49 in response to identifying signals from the contents marker 56 so as to interrupt the transfer of the three-bit digital signals from the second delay register 41 to the coarse output register 42 and to effect such transfer to the fine output register 43. This transfer occurs at the end of this interval and for subsequent intervals in which the contents of the second delay register 41 is a fine word. It will be seen that, at such time, the first fine word F*n*(3) which rests in both the first and second delay registers 39 and 41 is transferred respectively from the second delay register 41 to the fine output register 43 and from the first delay register 39 to the second delay register 41. The second coarse word *Ca*(2) is left undisturbed in the coarse output register 42 and continues to be impressed upon the digital-to-analog converter 45. In this way, the third reconstituted six-bit digital signal consists of the second coarse word *Ca*(2) and the first fine word F*n*(3). Also, the sixth fine word F(6) is placed in the examination register 37 and transferred at the end of the time interval to the accordion register 38, from which the fifth word F(5) is transferred to the first delay register 39.

DECODER TIME INTERVAL 6

At the end of this interval the first fine word F*n*(3) in the second delay register 41 is transferred to the fine output register 43 and combined in the digital-to-analog converter 45 with the second coarse word *Ca*(2) in the coarse output register to form the fourth six-bit digital signal. Fifth and sixth fine words F(5) anad F(6) are transferred respectively to the second and first delay registers 41 and 39. During the interval the seventh fine word F(7) is placed in the examination register 37 from which it is transferred at the end of the interval to the accordion register 38.

DECODER TIME INTERVAL 7

The eighth fine word F(8) is placed in the examination register 37 from which it is transferred to the accordion register 38 at the end of the interval. The fifth, sixth and seventh fine words F(5), F(6) and F(7) are advanced one register each in the manner previously described so that the fifth fine word F(5) is transferred to the fine output register 43 for combination in the digital-to-analog converter 45 with the second coarse word *Ca*(2) to constitute the fifth six-bit digital signal. This, then, is the first such signal which comprises a fine word other than the first fine word F*n*(3) appearing in the first four reconstituted six-bit digital signals.

In both the fine and coarse word operating modes of the receiver decoder, the three-bit digital signals are transferred through successive members of the chain of registers, the signals being advanced from one register to another at the end of each time period under the control of appropriately timed transfer pulses. It is to be especially noted that, three-bit coarse words are passed, in successive time intervals, through the accordion register 38 and the first and second delay registers 39 and 41. Consequently, the coarse data output to the coarse output register 42 is delayed from its input to the accordion register 38 by three (3) words intervals. In the fine word operating mode of the decoder, the three-bit fine words are passed, in successive time intervals through the examination register 38, the accordion register 38 and the first and second delay registers 39 and 41. Thus, the fine data output to the fine output register 43 is delayed from its input to the examination register 37 by four (4) word intervals. It is seen that such expansion by one word interval of the processing time for fine data as compared to the coarse data processing time at the decoder of FIGURE 2 compensates for the compression by one word interval of the fine data processing time as compared to the coarse data processing time at the encoder of FIGURE 1.

DECODER TIME INTERVAL 8

At the end of the interval, the fine word F(6) is advanced to the fine output register 43 for combination with the coarse word *Ca*(2) to constitute the sixth six-bit digital word; also, the fine words F(7) and F(8) are advanced respectively to the second and first delay registers 41 anad 39. During the interval the fine word $F(8)^{\overline{MS}}$ is placed in the examination register 37. This word differs from the fine word F(8) received during INTERVAL 7 only in the most significant bit position and the two constitute the status-indicating signal signifying that the receiver should shift to its fine word operating mode. Hence, the comparison ligic 44, through the contents marker 51, applies control signals to the input gate 46 and the examination gate 52. The input gate 46 is actuated to effect the impression of the next-received three-bit digital signal upon the accordion register 38, as well as upon the examination register 37. The examination gate 52 is actuated to prevent the transfer, at the end of this time interval, of the fine word $F(8)^{\overline{MS}}$ from the examination register 37 to the accordion register 38. This fine word does not represent the brightness value of the ninth elemental picture area which, as assumed, is at a new coarse brightness level. It merely serves as a status-indicating signal and, thus, is discarded after it has served its function of effecting the described shift of the receiver decoder from its fine to its coarse word operating mode.

DECODER TIME INTERVAL 9

The new coarse word *Cb*(1) is received and placed in the examination and accordion register 37 and 38, from the latter of which it is transferred to the first delay register 39 at the end of the interval. The fine words F(7) and F(8) are advanced respectively to the fine output and second delay registers 43 and 41 respectively.

DECODER TIME INTERVAL 10

The second and last coarse word $Cb(2)^{\overline{MS}}$ of the new coarse level is received and placed in the examination and accordion registers 37 and 38 respectively. Because this is the status-indicating signal signifying a continuation of the receiver decoder in its coarse word operating mode and does not represent an actual picture brightness value, it is not transferred from the accordion register 38 to the first delay register 39 at the end of this time interval. Such transfer is inhibited by suitable operation of the coarse delete gate 47 under the control of a signal from the comparison logic 44 in response to appropriate signals from the contents marker 54. Accordingly, the coarse word *Cb*(1) is held in the first delay register 39 and, at the end of the interval, also is transferred to the second delay register 41. The last fine word F(8) of the first coarse brightness level is transferred to the fine output register 43 for combination with the coarse word *Ca*(2) in the coarse output register 42 to constitute the eighth and last six-bit digital signal representing elemental picture areas of the first coarse brightness level.

DECODER TIME INTERVAL 11

The first coarse word $Cc(1)$ of the new three-element third coarse brightness level is received and placed in the examination and accordion registers 37 and 38 from which it is transferred at the end of the interval to the first delay register 39. The select gates 48 are suitably operated under control of a signal from the decoder control logic 49 to transfer the first coarse word $Cb(1)$ of the second brightness level to the coarse output register 42. Because the fine word F(8) does not necessarily represent the fine brightness value of the first elemental picture area whose coarse brightness value is represented by the coarse word $Cb(1)$ and the receiver has no information regarding the new fine brightness value, an arbitrary three-bit fine word F(100) is set up in the fine output register 43 by the following means. A coarse bias switch 57 operates on a signal from the decoder control logic 49 to actuate a coarse bias gate 58 to impress upon the fine output register 43 such a signal which, in the illustrative embodiment of the invention may be either 000 or 100. It has been determined in practice that a 100 word is generally preferred because it represents an average of the eight fine brightness values. Also, during this interval, the repeated coarse word $Cb(1)$ is transferred from the first to the second delay registers 39 and 41 respectively.

DECODER TIME INTERVALS 12 AND 13

During respective ones of these intervals, the second and third coarse words $Cc(2)$ and $Cc(3)^{\overline{MS}}$ of the third coarse brightness level are received. The coarse word $Cc(2)$ is identical to the coarse word $Cc(1)$ received during INTERVAL 11. Ordinarily, the reception of two such identical coarse words would be a status-indicating signal to switch the receiver decoder to its fine word operating mode. The reception in INTERVAL 13, however, of the coarse word $Cc(3)^{\overline{MS}}$ differing from the preceding coarse word $Cc(2)$ only in the most significant bit position is a status-indicating signal signifying a switch of the receiver decoder from its fine to its coarse word operating mode. Consequently, the consecutive reception of two such status-indicating signals (go fine-go coarse) operates to keep the receiver decoder in its coarse word operating mode and causes it to perform in the same operating on $Cc(3)^{\overline{MS}}$ as was described for $Cb(2)^{\overline{MS}}$.

The further processing of the coarse words $Cc(2)$ and $Cc(3)^{\overline{MS}}$ and the processing of the other coarse words in the decoder is the same as that previously described. It is to be understood that the contents of the fine output register 43 continues to be the arbitrarily selected word F(100).

DECODER TIME INTERVALS 14, 15, 16 AND 17

The reception during INTERVALS 14 and 15 of the coarse words $Cd$ and $Ce$, together with their further processing in the decoder and the processing of the other coarse words in the decoder is the same as that previously described.

In the event that two successive elemental picture areas have brightness values which differ from one another such that they are represented by three-bit digital words (either coarse or fine) which together would constitute a status-indicating signal to switch the receiver from one operating mode to another, the least significant bit of the second of the conflicting words is inverted in the encoder of FIGURE 1 as described so as not to confuse the receiver decoder. These modified words are processed in the decoder of FIGURE 2 in the manner described for all three-bit digital signals except those constituting status-indicating signals.

Figure 12:
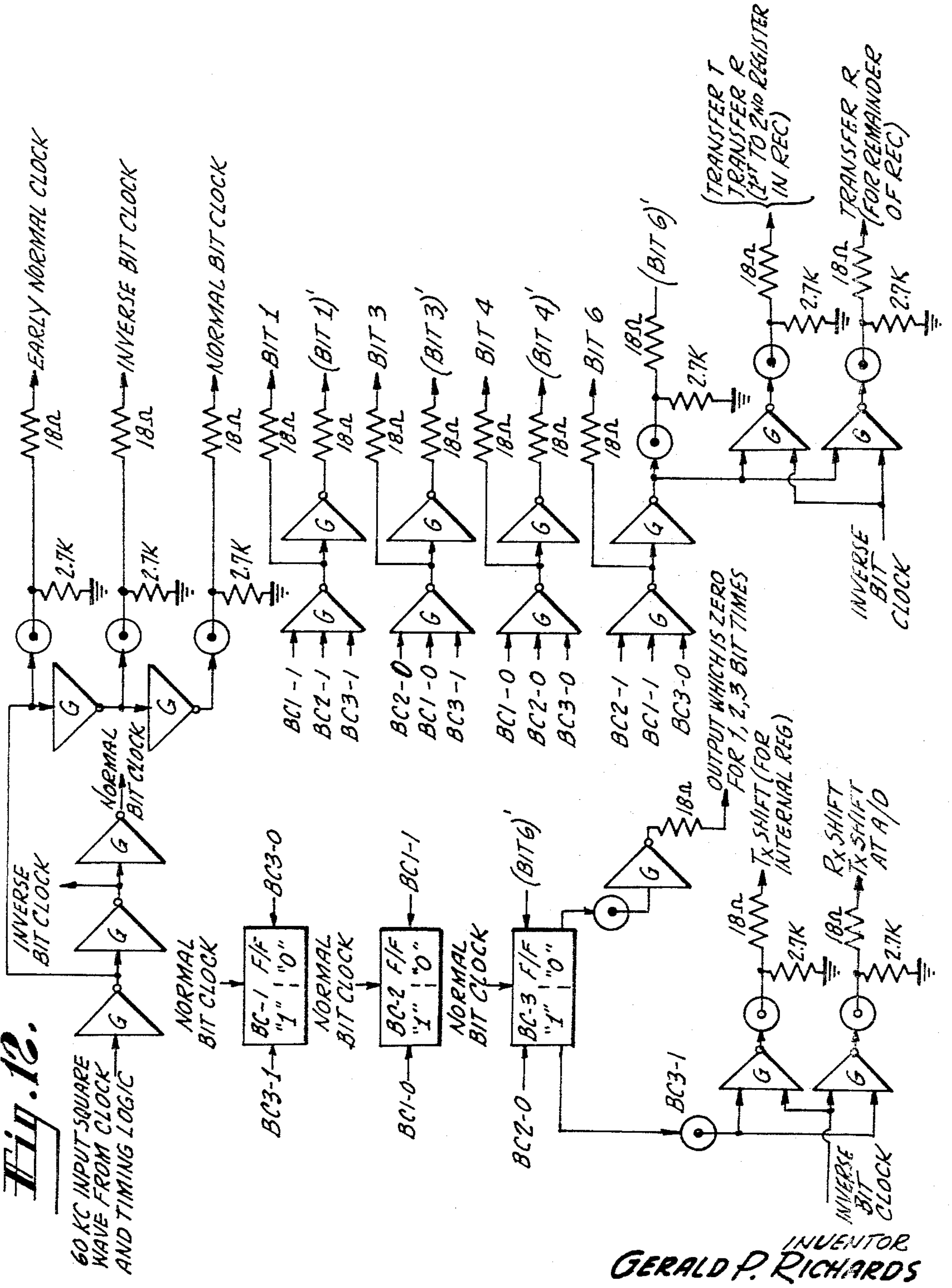
FIGURE 12 is a logic diagram of a clock which times the operation of the encoder and decoder apparatus of FIGURES 1 and 2.

The foregoing description of the block diagrams of FIGURES 1 and 2 indicates the manner in which the system in accordance with the invention operates. The circuit details of the apparatus elements of these figures are shown in FIGURES 3 to 11. The interconnections between the components of these latter figures are shown wherever possible without unnecessarily complicating the drawings. Where the showing of such connections is impractical, they have been indicated by suitable legends such as "3 MS BITS" in both FIGURES 3 and 4 signifying the connection between the coarse input register 22 of FIGURE 3 and the encoder coarse examination register 24 of FIGURE 4. Similar interconnections between the apparatus of FIGURES 3 to 11 and the clock logic diagram of FIGURE 12 are indicated by legends such as "NORMAL BIT CLOCK" in the coarse comparison logic 28 of FIGURE 4 and the clock logic diagram of FIGURE 12.

Figure 16:
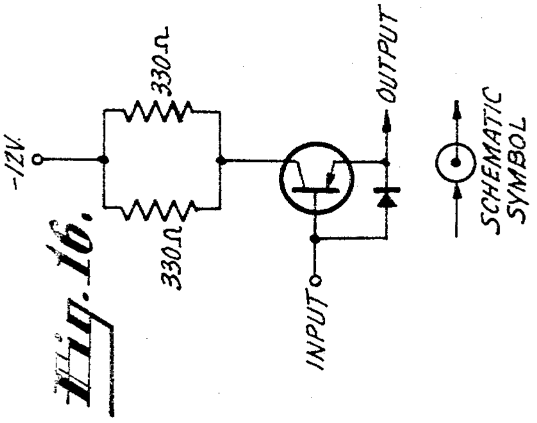
FIGURE 16 is a schematic circuit diagram of the power driver indicated in block form in the clock logic diagram of FIGURE 12.
Figure 11:
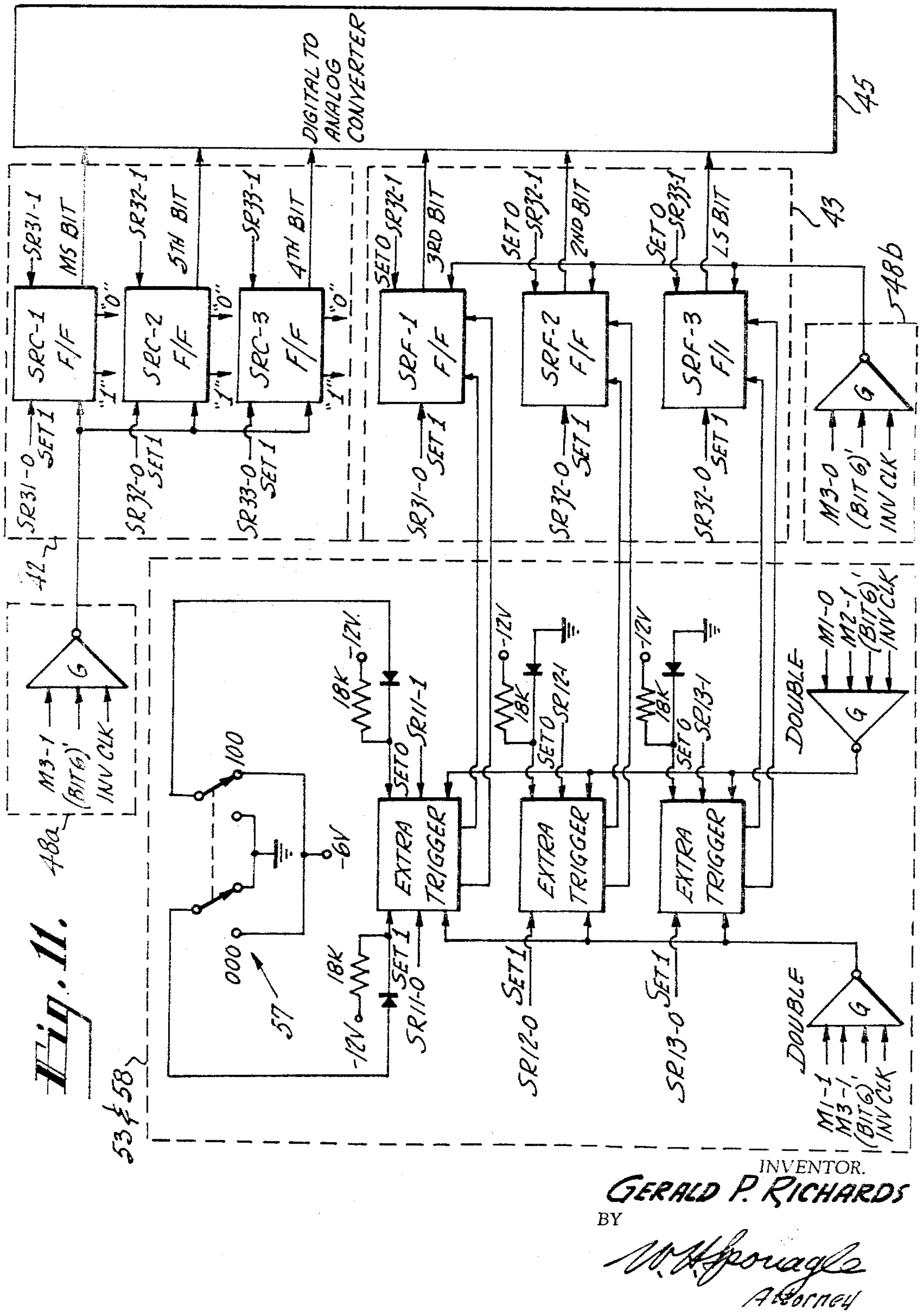
Figure 14:
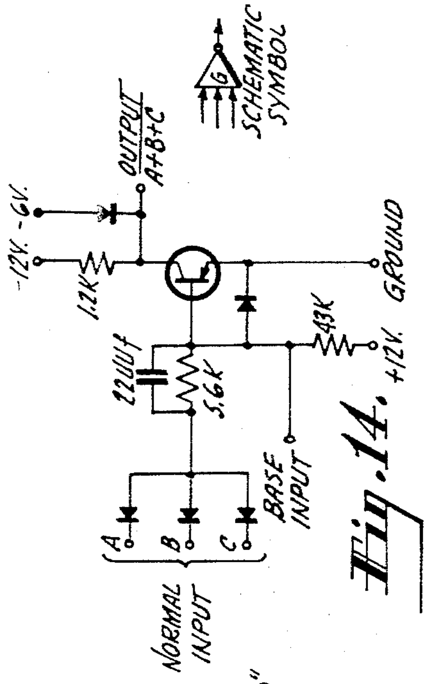
FIGURE 14 is a schematic circuit diagram of the NOR gate apparatus indicated in block form in the logic diagrams of FIGURES 3 through 12.
Figure 15:
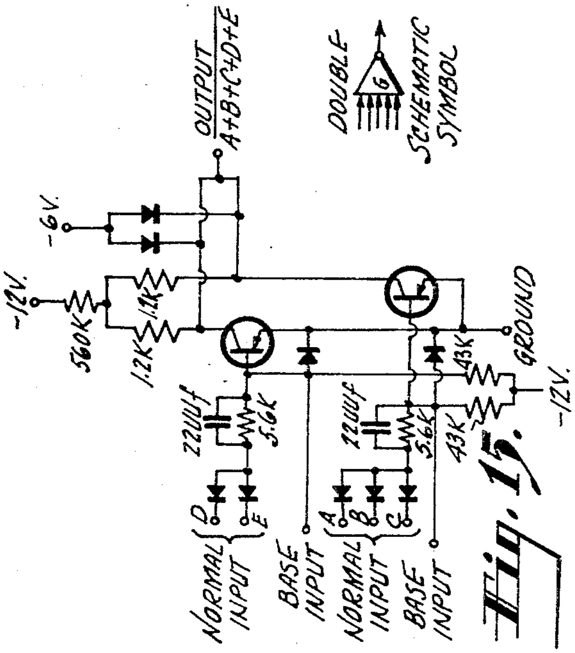
FIGURE 15 is a schematic circuit diagram of the double NOR gate apparatus indicated in block form in the logic diagrams of FIGURES 3 through 12.
Figure 13:
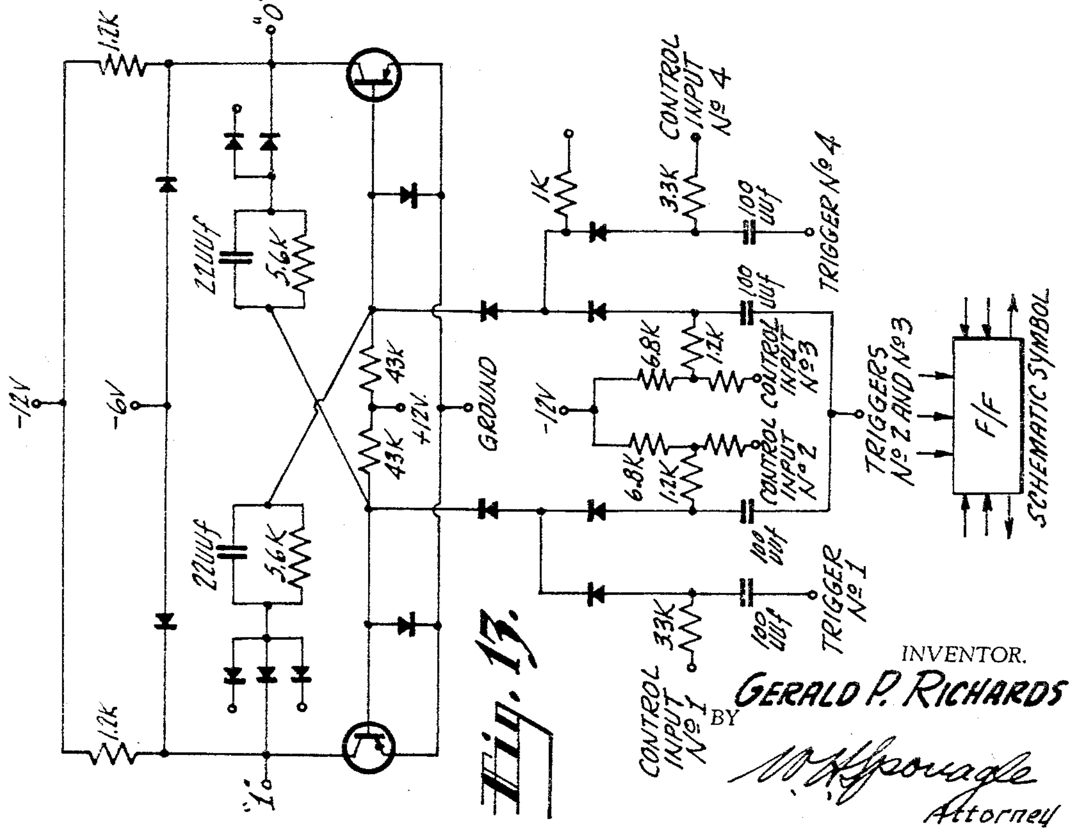
FIGURE 13 is a schematic circuit diagram of the flip-flop apparatus indicated in block form in the logic diagrams of FIGURES 3 through 12.
Figure 17:
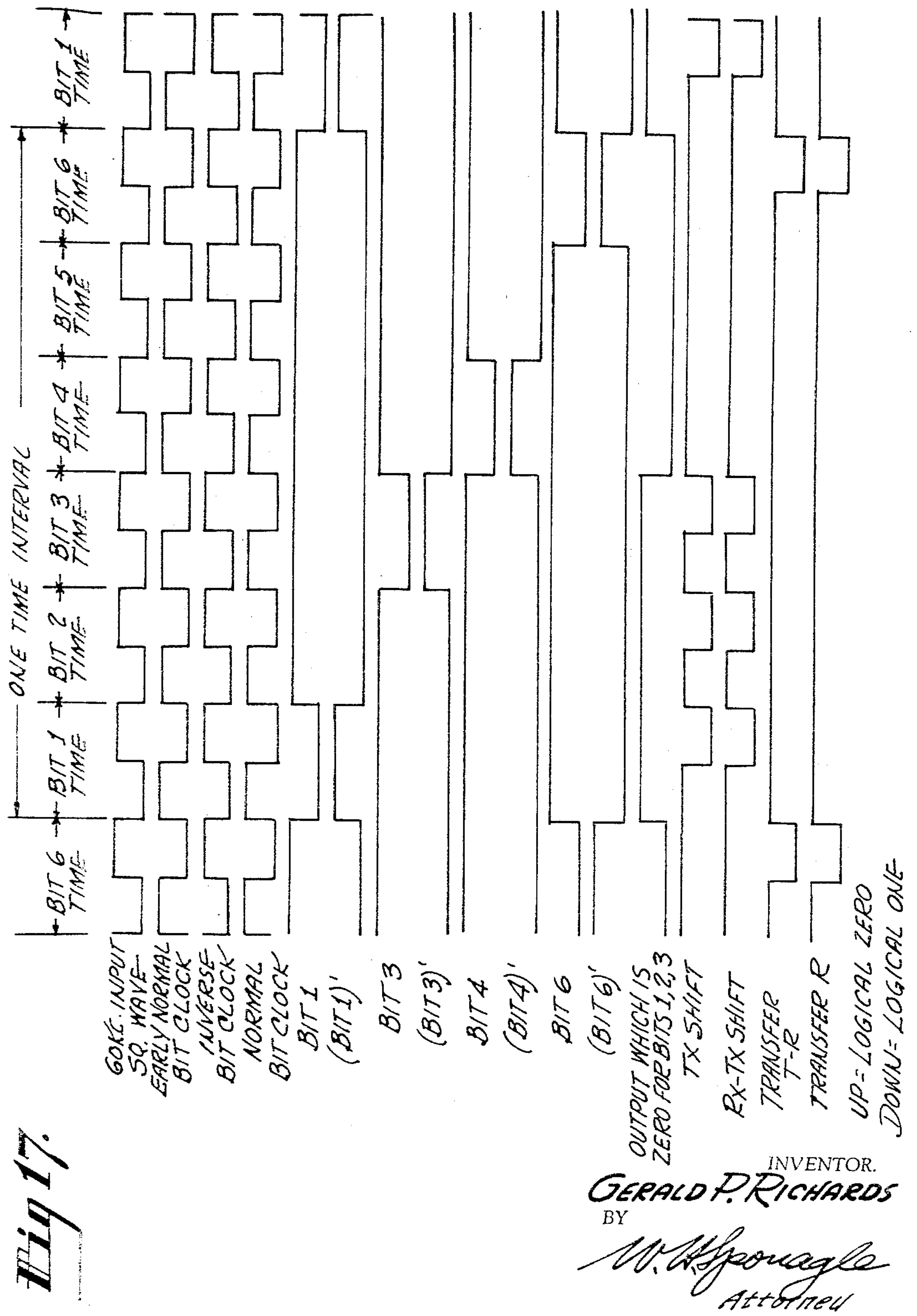
FIGURE 17 is a timing diagram of the clock pulses produced by the clock logic of FIGURE 12 and used to control the operation of the encoder and decoder apparatus of FIGURES 3 through 11.

The circuit details of the numerous flip-flops (F/F in FIGURES 3 to 11) used as registers and elsewhere are shown in FIGURE 13 which will be recognized as a conventional arrangement. The NOR gates also are conventional as indicated in the detail circuit diagrams of FIGURES 14 and 15. Finally, a conventional power driver, such as included in the clock logic diagram of FIGURE 12, is shown in detail in FIGURE 16.

In the illustrative form of a system embodying the invention disclosed herein, the encoder apparatus of FIGURE 1 and the decoder apparatus of FIGURE 2 have, for convenience of description, been directly connected to one another and a single clock has been employed to time the operations of both encoder and decoder apparatus. In actual practice, however, the encoder and decoder apparatus may be at different geographical locations in which case separate clocks will be used. It will be understood that conventional means may be employed to synchronize the two clocks with one another and that the transmission channel between encoder and decoder may consist of wire and/or radio links.

In any case, it is seen that the present invention provides a signalling system for the transmission and reception of information having generally six-bit accuracy in a channel having considerably less bandwidth than is required for handling six-bit digital signals.

From the foregoing description, it is seen that this processing technique is not limited to a 64 level six-bit binary system yielding three-bit (8 level) transmitted data which can be reconstructed to 64 levels at the receiver. This process and the described apparatus approach can be used in any data system having a determinable number of levels M for the variable (i.e. signal) to be conveyed over a channel which is capable of handling only a lesser number of signals representing determinable levels. For such a case, the number of determinable levels M need only be divided among two groups A and B, each containing K determinable levels in such a manner that one level from group A (K possibilities) together with one level from group B (K possibilities) jointly specify $K^2=M$ possibilities. Each group (A or B) requires only the square root of M determinable levels to jointly specify any one of the M values. In most instances, the assignment of the $K^2=M$ possibilities to K possible levels in group A and K possible levels in group B would be arranged to provide at least coarse knowledge of the precise level of the M original possibilities when information from only one group (for example A) is available. Such an assignment, however, is not intrinsic to the data compression technique which has been described.

In the system which was constructed as previously described, M was chosen to be 64, K was made equal to the square root of 64 (8), one group A of 8 level (three-bits) was arranged to convey coarse knowledge of the original level and, as a consequence, the other group B conveyed 8 levels (3-bits) of fine selection within any coarse level.

What is claimed is:

1. In a television system for subject representative digital signals in which the brightness values of the elemental subject areas are represented respectively by a code of N digits of which the first $N/2$ digits constitute a coarse word signifying one of K coarse brightness values of said subject and the last $N/2$ digits constittue a fine word signifying one of K fine brightness values of said subject within any one of said coarse brightness values, the combination comprising:

means for sequentially transmitting a first predetermined number of said coarse words representing a first coarse brightness value of said subject;

means for discontinuing said coarse word transmission in response to a determination that said first coarse picture brightness value is represented by at least a second predetermined number greater than said first predetermined number of said coarse words;

means following said coarse word transmission discontinuation for sequentially transmitting one or more of said fine words representing fine brightness values of said subject within said first coarse brightness value;

means responsive to a determination that at least one other coarse word is produced representing a second coarse brightness value of said subject for discontinuing said fine word transmission and reverting to said coarse word transmission;

means for sequentially receiving both of said coarse and fine words; and means having coarse and fine word operating modes respectively, for processing said sequentially received coarse and fine words of $N/2$ digits so as produce signals having N digits and comprising combinations of said coarse and fine words of $N/2$ digits.

2. A system for the transmission of information indicative of successive $n$ bit words, comprising, in combination:

means for deriving from each word two groups of bits, a coarse group comprising the $n$-$x$ most significant bits of the word and a fine group comprising the $x$ least significant bits of the word, where $n$ and $x$ are both integers and $x$ is smaller than $n$;

means for transmitting at least one coarse group of bits in the absence of the transmission of a fine group of bits;

means responsive to a given number of successive binary words containing coarse groups of bits of the same value for terminating the transmission of a coarse group of bits and transmitting instead successive fine groups of bits; and means responsive to a change in value of the coarse groups of bits in successive binary words for terminating the transmission of a fine group of bits and transmitting instead a coarse group of bits.

3. A system as set forth in claim 2 wherein $x=n/2$.

4. A system as set forth in claim 2 further including means responsive to a given number of successive binary words containing coarse groups of bits of the same value for signalling the termination of a transmission of said coarse group of bits, said means including means for changing the value solely of the most significant bit in the coarse group of bits being transmitted.

5. A system as set forth in claim 2, further including means responsive to two successive binary words containing coarse groups of bits of different value for signalling the termination of a transmission of a fine group of bits, said means including means for changing the value solely of the most significant bit in the fine group of bits then being transmitted.

6. A system as set forth in claim 4, further including means responsive to two successive binary words containing coarse groups of bits which differ in value from one another only in their most significant bit for transmitting two coarse groups of bits which differ in value from one another both in their most significant and in their least significant bits.

7. A system for transmitting information representing successive analog quantities, comprising, in combination:

means for converting each analog quantity to two groups of signals representing binary digits, the first group, hereafter termed a coarse word, defining the coarse value of the analog quantity and the second group, hereafter termed a fine word, defining the fine value of the analog quantity;

means for transmitting at least one coarse word in the absence of the transmission of a fine word;

means responsive to a given number of successive generations of analog quantities of the same coarse value for terminating the transmission of a coarse word and transmitting instead a five word; and means responsive to a change in the coarse value of the analog quantity for terminating the transmission of a fine word and transmitting instead a coarse word.

8. In a television system for subject representative digital signals in which the brightness values of the elemental subject areas are represented respectively in a series of equal time intervals by a six digit code of which the first three digits constitute a coarse word signifying one of eight coarse brightness values of said subject and the last three digits constitute a fine word signifying one of eight fine brightness values of said subject within any one of said coarse brightness values, the combination comprising:

a three-digit coarse register capable of receiving a succession of said coarse words;

a three-digit fine register capable of receiving a succession of said fine words associated respectively with said coarse words;

a three-digit coarse examination register;

a three-digit fine memory register;

a three-digit status signalling register;

a three-digit delay register;

means operative during each of a series of said time intervals for transferring successive ones of said coarse words from said coarse register to said coarse examination register;

coarse word comparison means operative during each of said series of time intervals for comparing each coarse word in said coarse examination register with the immediately succeeding coarse word in said coarse register to determine identity or non-identity of successive ones of said course words;

means operative during each of a series of said time intervals immediately following said transfer of coarse words to said examination register and responsive to a determination by said coarse word comparison means of less than four successive identical coarse words for transferring successive ones of said coarse words from said coarse examination register to said status signalling register;

means operative during each of said series of said time intervals and only while said transfer of coarse words to said status signalling register is occurring for transferring successive ones of said fine words from said fine register to said fine word memory register;

means operative during each of a series of said time intervals immediately following said transfer of coarse words to said examination register and responsive to a determination by said coarse word comparison means of at least four successive identical coarse words for transferring successive ones of said fine words from said fine word register to said status signalling register;

means operative during each of a series of said time intervals immediately following said transfer of words to said status signalling register for transferring successive ones of said words out of said signalling register to said delay register; and means operative during each of a series of said time intervals immediately following said transfer of words to said delay register for transferring successive ones of the three-digit words out of said delay register for transmission to a receiver.

9. The combination in a television system as defined in claim 8 having additionally in response to said determination by said comparison means of at least four successive identical coarse words:

means for transferring only the first two of said coarse words to said status signalling register; and means operative in said time interval immediately following said transfer of the second coarse word to said status-signalling register for transferring a selected one of said fine words associated with said second, third and fourth coarse words from said fine memory register to said status-signalling register.

10. The combination in a television system as defined in claim 8 having additionally in response to a determination by said comparison means of the non-identity of a coarse word following a succession of at least four identical coarse words:

means for repeating in said delay register the last fine word associated with said at least four identical coarse words but with the most significant digit thereof inverted; and means for transferring said non-identical coarse word to said status signalling register.

11. The combination in a television system as defined in claim 8 having additionally in response to a determination by said coarse word comparison means of the non-identity only in the most significant digit of two successive coarse words:

means for inverting the least significant digit of the second one of said non-identical coarse words while said second non-identical word rests in said examination register.

12. The combination in a television system as defined in claim 8 having additionally:

fine word comparison means operative during each of said series of time intervals while fine words are being transferred to said delay register for comparing each fine word in said delay register with the immediately succeeding fine word in said status signalling register to determine a non-identity of such fine words only in the most significant digit thereof; and means responsive to said non-identity determination for inverting the least significant digit of the second of said non-identical fine words when it is transferred to said delay register.

13. In a television system for subject representative digital signals in which the brightness values of the elemental subject areas are represented respectively by a six-digit code of which the first three digits constitute a coarse word signifying one of eight coarse brightness values of said subject and the last three digits constitute a fine word signifying one of eight fine brightness values of said subject within any one of said coarse brightness values, a receiver for successive ones of said three-digit words operating in a coarse word mode when receiving coarse words and in a fine word mode when receiving fine words, said receiver comprising in combination:

a three-digit examination register;

a three-digit accordion register;

first and second three-digit delay registers;

a three-digit coarse word output register;

a three-digit fine word output register;

means operative during each of a first sreies of said time intervals for impressing successive ones of all received three-digit words upon said examination register;

comparison means operative during each of said first series of time intervals for comparing each three-digit word in said examination register with the immediately succeeding received three-digit word to determine identity or non-identity of the most significant digits of successive ones of said received three-digit words, thereby to produce a control signal by which to set the subsequent operating mode of said receiver;

means operative in the coarse word operating mode of said receiver for directly impressing received three-digit coarse words upon said accordion register concurrently with said received word impression upon said examination register;

means operative in the fine word operating mode of said receiver and during each of said first series of time intervals for discontinuing said direct impression of received three-digit words upon said accordion register and for transferring received three-digit fine words from said examination register to said accordion register;

means operative in both the coarse and fine word operating modes of said receiver and during each of a series of time intervals immediately following said transfer of three-digit words to said accordion register for transferring successive ones of said three-digit words from said accordion register to said first delay register;

means operative in both the coarse and fine word operating modes of said receiver and during each of a series of time intervals immediately following said transfer of three-digit words to said first delay register for transferring successive ones of said three-digit words from said first delay register to said second delay register;

means operative in said coarse word operating mode of said receiver and during each of a series of time intervals immediately following said transfer of three-digit coarse words to said second delay register for transferring successive ones of said three-digit coarse words from said second delay register to said coarse word output register; and means operative in said fine word operating mode of said receiver and during each of said series of time intervals immediately following said transfer of three-digit fine-words to said second delay register for transferring successive ones of said three-digit fine words from said second delay register to said fine word output register;

the combined contents of said coarse and fine word output registers constituting a succession of reconstructed six-digit words respectively representing approximately the brightness values of the elemental areas of said subject.

14. The receiver in a television system as defined in claim 13 having additionally:

means operative in said coarse word operating mode and in the time interval immediately following the reception of a first fine word after the reception of two identical coarse words for transferring said first fine word from said accordion register to said fine word output register and for substantially concurrently therewith also transferring said first fine word to said first delay register; and means for transferring the first of said two identical received coarse words to said coarse word output register concurrently with the transfer of said first fine word to said fine word output register, whereby to constitute a first six-digit word representing approximately the brightness value of a first elemental area of a coarse brightness value extending through at least four successive elemental picture areas.

15. The receiver in a television system as defined in claim 13 having additionally:

means operative in said fine word operating mode and in response to the reception in two successive time intervals of two fine words differing from one another only in the most significant digit for transferring the first one of said two fine words to said accordion register in the second one of said two time intervals; and means operative in a third time interval immediately following the second one of said two time intervals for switching said receiver to said coarse word operating mode, whereby to impress the coarse word received during said third time interval upon both of said examination and accordion registers and to effectively delete the second one of said two fine words.

16. The receiver in a television system as defined in claim 13 having additionally:

means operative in said coarse word operating mode and in response to the reception in two successive time intervals of two coarse words differing from one another only in the most significant digit for effecting a continuation of said coarse word operating mode.

17. The receiver in a television system as defined in claim 13 having additionally:

means operative in said coarse word operating mode and in response to the reception in three successive time intervals of three coarse words of which the first two words are identical and the third word differs from the second word only in the most significant digit for effecting a continuation of said coarse word operating mode.

References Cited

UNITED STATES PATENTS

| | | | |
|---|---|---|---|
| 2,850,574 | 9/1958 | Kretzmer. | |
| 2,946,851 | 7/1960 | Kretzmer | 325—44 |
| 3,071,727 | 1/1963 | Kitsopoulos | 179—15.55 |
| 3,241,135 | 3/1966 | Kuflik et al. | |

ROBERT L. GRIFFIN, *Primary Examiner.*

B. L. LEIBOWITZ, *Assistant Examiner.*

U.S. Cl. X.R.

179—15.55; 325—44